(12) United States Patent
Ho et al.

(10) Patent No.: US 10,686,574 B2
(45) Date of Patent: Jun. 16, 2020

(54) METHODS AND APPARATUS FOR INDICATING A RADIO RESOURCE TO A RECEIVER IN A WIRELESS COMMUNICATION SYSTEM

(71) Applicant: Industrial Technology Research Institute, Hsinchu County (TW)

(72) Inventors: Chung-Lien Ho, Taoyuan (TW); Tsung-Hua Tsai, Kaohsiung (TW); Ren-Jr Chen, Hsinchu (TW); Zanyu Chen, Taoyuan (TW); Wen-Chiang Chen, Hsinchu (TW)

(73) Assignee: Industrial Technology Research Institute, Hsinchu County (TW)

( * ) Notice: Subject to any disclaimer, the term of this patent is extended or adjusted under 35 U.S.C. 154(b) by 44 days.

(21) Appl. No.: 16/103,705

(22) Filed: Aug. 14, 2018

(65) Prior Publication Data
US 2019/0058561 A1 Feb. 21, 2019

Related U.S. Application Data

(60) Provisional application No. 62/547,082, filed on Aug. 17, 2017, provisional application No. 62/556,514, filed on Sep. 11, 2017.

(51) Int. Cl.
*H04L 5/00* (2006.01)
*H04W 72/08* (2009.01)
(Continued)

(52) U.S. Cl.
CPC ......... *H04L 5/0051* (2013.01); *H04B 7/0408* (2013.01); *H04B 7/0617* (2013.01);
(Continued)

(58) Field of Classification Search
CPC ... H04L 5/0051; H04L 5/0048; H04L 5/0091; H04B 7/0408; H04B 7/0617;
(Continued)

(56) References Cited

U.S. PATENT DOCUMENTS 9,419,696 B2 8/2016 Dinan
2015/0078271 A1* 3/2015 Kim .................... H04B 7/0417
370/329
(Continued)

FOREIGN PATENT DOCUMENTS

TW 201517673 5/2015
WO WO 2017/023231 A1 2/2017
WO WO 2017/136732 A1 8/2017

OTHER PUBLICATIONS

Z. Pi et al., An introduction to millimeter-wave mobile broadband systems. IEEE Communications Magazine, pp. 101-107, Jun. 2011.
(Continued)

*Primary Examiner* — Duc C Ho
(74) *Attorney, Agent, or Firm* — Finnegan, Henderson, Farabow, Garrett & Dunner, L.L.P.

(57) ABSTRACT

Methods and apparatus for indicating a radio resource to a receiver in a wireless communication system, the method including allocating a plurality of reference signals (RSs) for beam indication, selecting one of the plurality of RSs for the receiver, and transmitting information about the selected RS to the receiver, wherein the information includes a reference indication (RI) that indicates the radio resource of the selected RS.

36 Claims, 13 Drawing Sheets

(51) Int. Cl.
*H04B 7/06* (2006.01)
*H04B 7/0408* (2017.01)
*H04B 7/08* (2006.01)

(52) U.S. Cl.
CPC ......... *H04B 7/0626* (2013.01); *H04B 7/0695* (2013.01); *H04B 7/088* (2013.01); *H04L 5/0048* (2013.01); *H04L 5/0091* (2013.01); *H04W 72/085* (2013.01)

(58) Field of Classification Search
CPC .... H04B 7/0626; H04B 7/0695; H04B 7/088; H04W 72/085
See application file for complete search history.

(56) References Cited

U.S. PATENT DOCUMENTS

| | | | |
|---|---|---|---|
| 2015/0341093 A1* | 11/2015 | Ji | H04B 7/0478 375/267 |
| 2017/0026938 A1* | 1/2017 | Onggosanusi | H04B 7/0626 |
| 2017/0055265 A1 | 2/2017 | Wei | |
| 2017/0188375 A1 | 6/2017 | Seo et al. | |
| 2017/0195031 A1 | 7/2017 | Onggosanusi et al. | |
| 2018/0042000 A1* | 2/2018 | Zhang | H04B 7/04 |
| 2018/0219606 A1* | 8/2018 | Ng | H04B 7/0617 |
| 2018/0227031 A1* | 8/2018 | Guo | H04B 7/0626 |

OTHER PUBLICATIONS

W. Roh et al., Millimeter-wave beamforming as an enabling tech. for 5G cellular comm.: Theoretical feasibility and prototype results. IEEE Comm. Mag., pp. 106-113, Feb. 2014.
B. Yin et al., High-throughput beamforming receiver for millimeter wave mobile communication. IEEE Globecom 2013. pp. 3697-3702 (2013).
S. Rajagopal et al., Antenna array design for multi-Gbps mmWave mobile broadband communication. IEEE Globecom 2011, pp. 1-6 (2011).
F. Khan et al., Millimeter-wave mobile broadband with large scale spatial processing for 5G mobile communication, IEEE Fiftieth Annual Allerton Conf., pp. 1517-1523, Oct. 2012.
T. Kim et al., Tens of Gbps support with mmWave beamforming systems for next generation communications. IEEE Globecom 2013, pp. 3685-3690 (2013).
Office Action issued by the Taiwan Intellectual Property Office in Application No. 107128873, dated May 15, 2019 (36 pgs.).

* cited by examiner

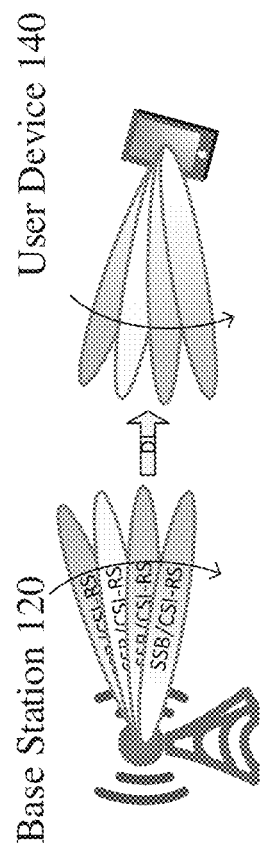
Fig. 2(a) P1: TRP Tx beam & UE Rx beam alignment
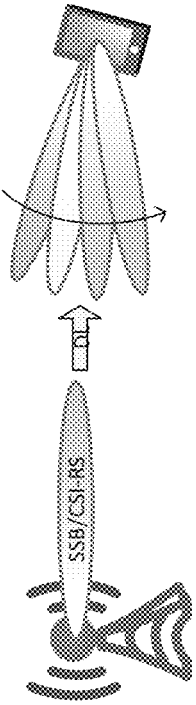
Fig. 2(b) P2: TRP Tx beam refinement
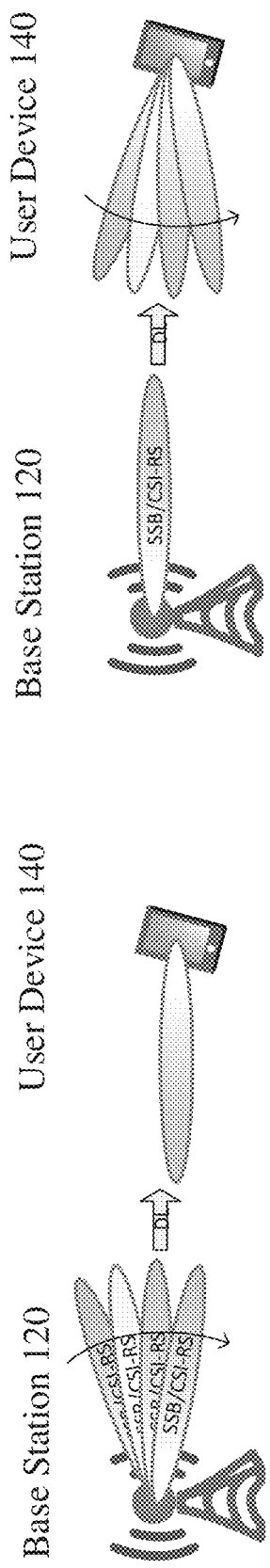
Fig. 2(c) P3: UE Rx beam refinement

Fig. 6

| Reference indicator i.e. MRI | RS type (Resource setting Dj) | Measurement Index | RS index to reference indicator association | RS index |
|---|---|---|---|---|
| 0 | SSB (j = 0) | n − 22 | Implicit | TI = 0 ~ 15 (full set) |
| 1 | SSB (j = 0) | n − 17 | Explicit | TI = 12 |
| 2 | P-CSI-RS (j = 1), SP-CSI-RS (j = 2) | n − 16, n − 5 | Explicit, Implicit | $CRI_1$ = 3, 4, $CRI_2$ = 22, 23 (full set) |
| 3 | SP-CSI-RS (j = 2) | n − 13 | Explicit | CRI = 4, 6 |
| 4 | A-CSI-RS (j = 3) | n − 8 | Implicit | CRI = 9, 19, 20 (full set) |
| 5 | SP-CSI-RS (j = 2) | n − 5 | Explicit | CRI = 5, 15, 16 |
| 6 | A-CSI-RS (j = 3) | n − 2 | Implicit | CRI = 11, 12 (full set) |
| 7 | A-CSI-RS (j = 3) | n − 1 | Explicit | CRI = 41, 42 |

Signaled to UE explicitly by RRC/MAC-CE

Signaled to UE explicitly by RRC/MAC-CE

NOTE 1: This table could be updated by RRC signals or MAC-CEs before application.
NOTE 2: In case of implicit association, the full set of RS indexes may be either a full measured set configured by gNB or an up-to-date full set reported by UE.

METHODS AND APPARATUS FOR INDICATING A RADIO RESOURCE TO A RECEIVER IN A WIRELESS COMMUNICATION SYSTEM

CROSS REFERENCE TO RELATED APPLICATION

The present application claims the benefit of priority to U.S. Provisional Applications No. 62/547,082, filed on Aug. 17, 2017, and No. 62/556,514, filed on Sep. 11, 2017, the entire contents of which are incorporated herein by reference.

TECHNICAL FIELD

The present application relates to methods and apparatus for indicating a radio resource to a receiver in a wireless communication system.

BACKGROUND

Beamforming transmissions provide efficient signal and data transmissions in wireless communication systems. A beamforming transmitter generally forms its transmissions into one or more transmit beams through an antenna array. On the other hand, a beamforming receiver can either receive directly or receive based on information about the transmit beams. The latter alternative can provide more efficient transmission and higher spectral efficiency at the cost of indication of a transmit beam. However, the beamforming transmitter may change the beams it transmits in different transmissions in accordance with channel conditions. Timely and accurate indication of the transmit beam or a radio resource of the transmission is therefore needed for the receiver to efficiently receive signals.

SUMMARY

Embodiments of the present application provide improved methods and apparatus for indicating a radio resource to a receiver in a wireless communication system.

These embodiments include a method for indicating a radio resource to a receiver in a wireless communication system. The method includes allocating a plurality of reference signals (RSs) for beam indication, selecting one of the plurality of RSs for the receiver, and transmitting information about the selected RS to the receiver, wherein the information includes a reference indication (RI) that indicates the radio resource of the selected RS.

These embodiments also include a method for receiving indication of a radio resource for a receiver in a wireless communication system. The method includes allocating a plurality of radio resources to receive RSs for beam indication from a transmitter, receiving information about the radio resource of a selected one of the RSs from the transmitter, wherein the information includes an RI that indicates the radio resource of the selected RS, and determining one of the plurality of RSs for receiving a signal from the transmitter in accordance with the indication of the radio resource of the selected RS.

These embodiments further include network apparatus for indicating a radio resource for a user device to receive a signal in a wireless communication system. The network apparatus includes a memory storing instructions and a processor configured to execute the instructions to cause the network apparatus to: allocate a plurality of RSs for beam indication, select one of the plurality of RSs for the user device, and transmit information about the selected RS to the user device, wherein the information includes an RI that indicates the radio resource of the selected RS.

These embodiments also include a user device for receiving indication of a radio resource in a wireless communication system. The user device includes a memory storing instructions and a processor configured to execute the instructions to cause the user device to: allocate a plurality of radio resources to receive RSs for beam indication from network apparatus, receive information about the radio resource of a selected one of the RSs from the network apparatus, wherein the information includes an RI that indicates the radio resource of the selected RS, and determine one of the plurality of RSs for receiving a signal from the network apparatus in accordance with the indication of the radio resource of the selected RS.

These embodiments further include a non-transitory computer-readable medium storing instructions that are executable by one or more processors of apparatus to perform a method for indicating a radio resource to a receiver in a wireless communication system. The method includes allocating a plurality of RSs for beam indication, selecting one of the plurality of RSs for the receiver, and transmitting information about the selected RS to the receiver, wherein the information includes an RI that indicates the radio resource of the selected RS.

These embodiments also include a non-transitory computer-readable medium storing instructions that are executable by one or more processors of apparatus to perform a method for receiving indication of a radio resource in a wireless communication system. The method includes allocating a plurality of radio resources to receive RSs for beam indication from a transmitter, receiving information about the radio resource of a selected one of the RSs from the transmitter, wherein the information includes an RI that indicates the radio resource of the selected RS, and determining one of the plurality of RSs for receiving the signal from the transmitter in accordance with the indication of the radio resource of the selected RS.

It is to be understood that the foregoing general description and the following detailed description are exemplary and explanatory only, and are not restrictive of the disclosure.

BRIEF DESCRIPTION OF THE DRAWINGS

FIGS. 2($a$)-2($c$) illustrate an exemplary method for beam management in a wireless communication system, according to some embodiments of the present application.

FIG. 6 is an exemplary table indicating a radio resource to a receiver in a wireless communication system, according to some embodiments of the present application.

DETAILED DESCRIPTION

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the disclosure. Instead, they are merely examples of methods and apparatus consistent with aspects related to the disclosure.

Figure 1:
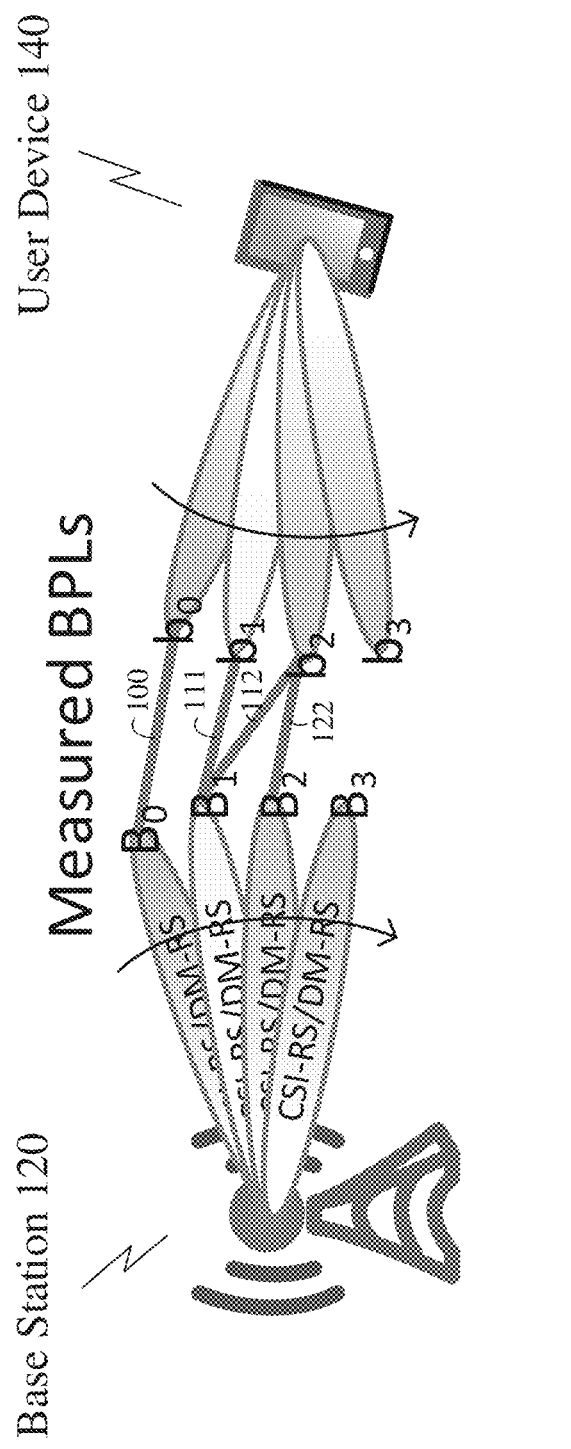
FIG. 1 illustrates an exemplary scenario for beam indication in a wireless communication system, according to some embodiments of the present application.

FIG. 1 illustrates an exemplary scenario for beam indication in a wireless communication system, according to some embodiments of the present application. The wireless communication system can be, for example, a fifth generation (5G) radio access system, a Long-Term Evolution (LTE) radio access system, a High Speed Packet Access (HSPA) radio access system, a Wideband Code-Division Multiple Access (WCDMA) communication system, the Institute of Electrical and Electronics Engineers (IEEE) 802.11 wireless local area network (WLAN), or an IEEE 802.16 wireless metropolitan area networks (WMAN).

As shown in FIG. 1, the wireless communication system includes a base station 120 and a user device 140. Base station 120 can be, for example, an advanced base station (ABS), a base transceiver system (BTS), a home base station, a relay station, a repeater, a remote radio head (RRH), an intermediate node, a next-generation Node B (gNodeB or gNB), a 5G node B in a 5G radio access system, an evolved node B (eNB), a relay node, an RRH in an LTE radio access system, or an access point (AP) in an IEEE 802.11 WLAN system. Base station 120 transmits radio signals carrying system information of the wireless communication system.

User device 140 can be, for example, a mobile station, an advanced mobile station (AMS), a server, a terminal device, a client terminal, a desktop computer, a laptop computer, a netbook, a workstation, a personal digital assistant (PDA), a personal computer (PC), a telephone device, a camera, a television, a handheld gaming device, a music device, a wireless sensor, a smartphone, a network interface card, or a machine type terminal. As another example, user device 140 is user equipment in a 5G or LTE radio access system. Each of user device 140 and base station 120 contains a communication unit that can transmit and receive radio signals.

As shown in FIG. 1, base station 120 transmits downlink signals to user device 140 through one or more of transmit beams $B_0$, $B_1$, $B_2$, and $B_3$. Transmit beams $B_0$, $B_1$, $B_2$, and $B_3$ are considered to be used for transmitting, for example, reference signals (RSs) for beam management on corresponding RS radio resources. User device 140 receives the downlink signals through one or more of receive beams $b_0$, $b_1$, $b_2$, and $b_3$.

A beam management reference signal (BM-RS) is defined as a reference signal that is used for beam management. For example, a BM-RS can be a channel status information reference signal (CSI-RS) or demodulation reference signal (DM-RS), as shown in FIG. 1. Alternatively, a BM-RS can be a synchronization signal block (SSB) that includes a synchronization signal, or a synchronization signal and a physical broadcast channel (PBCH). In some embodiments, a BM-RS can be a sounding reference signal (SRS).

A beam pair link (BPL) is a measured transmission and reception link by user device 140 or base station 120 between one or more of transmit beams $B_0$, $B_1$, $B_2$, and $B_3$ and one or more of receive beams $b_0$, $b_1$, $b_2$, and $b_3$. For example, as shown in FIG. 1, a BPL 100 is a measured transmission and reception pair link between transmit beam $B_0$ and receive beam $b_0$. When base station 120 transmits by transmit beam $B_0$, user device 140 needs to receive by receive beam $b_0$ to realize the benefits of beamforming transmission. As another example, a BPL 111 is a measured transmission and reception pair link between transmit beam $B_1$ and receive beam $b_1$. Another BPL 112 is a measured transmission and reception pair link between transmit beam $B_1$ and receive beam $b_2$. When base station 120 transmits by transmit beam $B_1$, user device 140 can receive by either one or both of receive beams $b_1$ and $b_2$ to realize the benefits of beamforming transmission.

As another example, a BPL 122 is a measured transmission and reception pair link between transmit beam $B_2$ and receive beam $b_2$. When base station 120 transmits by transmit beam $B_2$, user device 140 needs to receive by receive beam $b_2$ to realize the benefits of beamforming transmission. When user device 140 receives by receive beam $b_2$, base station 120 needs to transmit by either one or both of transmit beams $B_1$ and $B_2$ to realize the benefits of beamforming transmission.

A BPL is determined based on base station or user device measurement on a reference signal that is transmitted or received in accordance with a spatial domain transmit/receive filtering configuration. For example, as shown in FIG. 1, BPL 100 can be determined based on a reference signal received power (RSRP) measurement on a CSI-RS that is transmitted by base station 120 on transmit beam $B_0$, and received by user device 140 through receive beam $b_0$. Base station 120 transmits the CSI-RS on one of a plurality of CSI-RS resources through transmit beam $B_0$ in accordance with a transmit spatial filtering configuration. User device 140 receives the CSI-RS on the one of the plurality of CSI-RS resources through receive beam $b_0$ in accordance with a receive spatial filtering configuration. In other words, BPL 100 is associated with transmit beam $B_0$, receive beam $b_0$, the CSI-RS, and/or the one of the plurality of CSI-RS resources. Alternatively, base station 120 and user device 140 can transmit another RS and measure on corresponding RS resources in the determination of BPL 100. The another RS can be, for example, another CSI-RS, a DM-RS, an SSB, an SRS, a BM-RS, or a signal that is referred to as or associated with a transmit beam and/or a receive beam.

An antenna port is defined such that a channel over which a symbol on the antenna port is conveyed can be inferred from the channel over which another symbol on the same antenna port is conveyed. There is one resource grid per antenna port. The antenna port used for transmission of a physical channel or signal depends on a number of antenna ports configured for the physical channel or signal.

Two antenna ports are defined as being quasi-co-located (QCL) if properties of a channel over which a symbol on one antenna port is conveyed can be inferred from the channel over which a symbol on the other antenna port is conveyed. In other words, two QCL antenna ports are considered as being of the same or similar transmission and reception parameters, such as spatial parameters, Doppler/delay parameters, and average gain. The QCL relation can be utilized to support beam management functionality, frequency/timing offset estimation functionality, and/or RRM management functionality.

When BPLs 100, 111, 112, and 122 are formed between base station 120 and user device 140 in accordance with the transmit beams formed by BM-RSs, e.g., CSI-RSs and/or SSBs, during beam management procedures, base station 120 can also transmit another downlink reference signal, e.g., a DM-RS, that is associated with one of the BM-RSs. A DM-RS port associated with the DM-RS can be considered as being QCL with one of a plurality of BM-RS ports.

For example, base station 120 transmits the DM-RS port on radio resources that is QCL with BM-RS ports on radio resources which are formed to transmit beams $B_1$ and $B_2$, respectively. User device 140 can receive the DM-RS and/or data on the radio resources by receive beam $b_2$ in accordance with BPLs 112 and 122, and/or by receive beam $b_1$ in accordance with BPL 111. As another example, when DM-RS port is quasi-co-located only with a BM-RS port on radio resources which are formed to transmit beam $B_1$, user device 140 receives the corresponding DM-RS and/or data on the radio resources by receive beam $b_1$ in accordance with BPL 111, and/or by receive beam $b_2$ in accordance with BPL 112.

The beam indication is part of beam management of base station 120. Beam management of base station 120 includes beam measurement, beam report, and beam indication. For beam management and beam indication thereof, a reference indicator (RI) is used to reference to a transmission and/or measurement on one or more RS resources by user device 140 or base station 120 in accordance with a spatial filtering configuration. In some embodiments, a measurement reference indicator (MRI) or a transmission configuration indication (TCI) can be used to achieve the same reference indication as the RI. In the present application, one of the RI, MRI, or TCI is used for description of embodiments, and the other two, another transmission configuration indication, or another measurement reference indicator can be an alternative to the one used in the embodiments.

The RS resources include, for example, CSI-RS, SSB, or SRS resources. Different resources of these RS resources can be referred to by CSI-RS resource indicator (CRI), SSB resource indicator (SSBRI), or SRS resource indicator (SRI). For example, a beam management procedure can include eight RSRP measurements of UE-specific CSI-RSs on allocated CSI-RS resources: 11, 12, 13, 14, 15, 16, 17, and 18. These CSI-RS resources can then be referred to as: CRI #11, CRI #12, CRI #13, CRI #14, CRI #15, CRI #16, CRI #17, and CRI #18, i.e., CRI={11, 12, 13, 14, 15, 16, 17, 18}. Another beam management procedure may include eight RSRP measurements of SSB on time indexes (TIs): 22, 23, 24, . . . , 29. These SSB resources can then be referred to as: SSBRI #22, SSBRI #23, SSBRI #24, . . . , and SSBRI #29, i.e., SSBRI={22, 23, 24, . . . , 29}.

A measurement index (MI) is used to refer to the different resources of these RS resources within a beam management procedure. For example, a beam management procedure includes eight RSRP measurements of UE-specific CSI-RSs at: CRI #11, CRI #12, CRI #13, CRI #14, CRI #15, CRI #16, CRI #17, and CRI #18, the eight CSI-RS resources can also be referred to as MI #0, MI #1, MI #2, MI #3, MI #4, MI #5, MI #6, and MI #7, i.e., MI={0, 1, 2, 3, 4, 5, 6, 7}, within the beam management procedure.

FIGS. 2(*a*)-2(*c*) illustrate an exemplary method for beam management in a wireless communication system, according to some embodiments of the present application. In FIGS. 2(*a*)-2(*c*), the method for beam management is applied to downlink (DL) beam management within one or multiple transmission and reception points (TRPs). The method includes three procedures: P1, P2, and P3. After a first P1 procedure, any of the P1, P2, or P3 procedure can take place as successive procedures for beam management of base station 120. For example, base station 120 can perform P2 procedures as the second and third procedures of its DL beam management with user device 140.

The P1 procedure of beam management is used to enable UE measurement on different TRP Transmission (Tx) beams to support selection of TRP Tx beams and UE Rx beams. In other words, the P1 procedure of beam management is for alignment between TRP Tx beams of base station 120 and Rx beams of user device 140.

For example, as shown in FIG. 2(*a*), a TRP of base station 120 transmits synchronization signal blocks (SSBs) and/or channel state information based reference signals (CSI-RSs) using TRP Tx beams in a beam-sweeping manner to user device 140. On the other hand, user device 140 receives and measures the SSBs or CSI-RSs on the TRP Tx beams and monitors reception qualities using its UE Rx beams in a beam-sweeping manner. User device 140 identifies preferred UE Rx beams based on measurement results. User device 140 can either explicitly or implicitly report TRP Tx beam quality measurement results to base station 120. In some embodiments, base station 120 can perform an intra- or inter-TRP Tx beam sweep through a set of different Tx beams.

The P2 procedure of beam management is used to enable UE measurement on different TRP Tx beams to change inter- or intra-TRP Tx beams. In other words, the P2 procedure can be used for TRP Tx beam refinement. In the P2 procedure, a smaller set of beams than that used in the P1 procedure can be used for beam refinement. In some embodiments, the P2 procedure is a special case of the P1 procedure.

For example, as shown in FIG. 2(*b*), a TRP of base station 120 transmits SSBs and/or CSI-RSs using TRP Tx beams in a beam-sweeping manner to user device 140. User device 140 measures TRP Tx beam quality based on RSRP on SSBs and/or CSI-RSs using a fixed Rx beam, such as a preferred Rx beam. User device 140 can either explicitly or implicitly report measurement results of the TRP Tx beam quality to base station 120. Base station 120 can refine the TRP Tx beam in accordance with the reported measurement results of the TRP Tx beam quality.

The P3 procedure of beam management is used to enable UE measurement on the same TRP Tx beams by using different UE Rx beams. In other words, the P3 procedure is used for UE Rx beam refinement.

For example, as shown in FIG. 2(c), a TRP of base station 120 transmits SSBs and/or CSI-RS using a fixed one of TRP Tx beams, such as a preferred Tx beam. User device 140 measures UE Rx beam quality based on RSRP on SSBs and/or CSI-RSs using different UE Rx beams in a beam-sweeping manner. User device 140 determines one or more UE Rx beams to be one or more preferred ones in accordance with its measurement results. User device 140 can refine its UE Rx beams accordingly.

In some embodiments, user device 140 implicitly reports the measurement results of the TRP Tx beam quality to base station 120 in a random access procedure associated with a preferred SSB during a P1 procedure. Alternatively, user device 140 can explicitly report the measurement results of the TRP Tx beam quality to base station 120 and indicates one or more preferred CRIs during a P2, a P3, or a joint P2 and P3 procedure.

In some embodiments, the method of beam management can also be used in uplink (UL) beam management. User device 140 can transmit sounding reference signals (SRSs) in a sweeping manner as those SSBs and/or CSI-RSs transmitted by base station 120 in DL beam management. Base station 120 can measure and/or indicate as user device 140 does in DL beam management. Accordingly, base station 120 and user device 140 can establish UE Tx beam and TRP Rx beam alignment in a U1 procedure of UL beam management. Base station 120 can refine TRP Rx beam in a U2 procedure of UL beam management. User device 140 can refine UE Tx beam in a U3 procedure of UL beam management.

Figure 3:
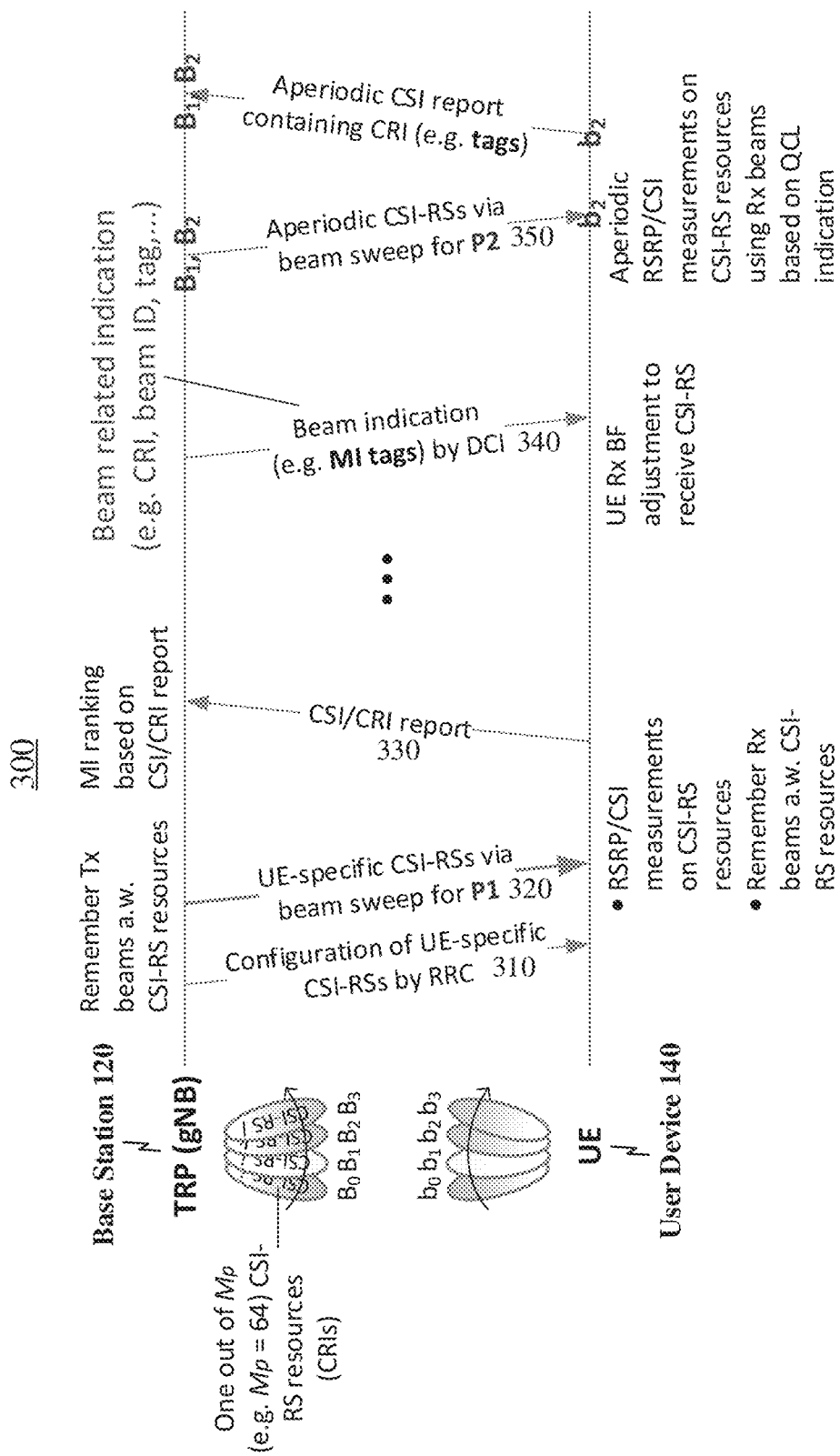
FIG. 3 illustrates an exemplary method for beam management in a wireless communication system, according to some embodiments of the present application.

FIG. 3 illustrates an exemplary method 300 for beam management in a wireless communication system, according to some embodiments of the present application. As used herein, indication of a transmit beam refers to providing identifying information of the beam to enable its receipt, measurement, or reference by, for example, a user device. As shown in FIG. 3, a TRP, e.g., a gNB or base station 120, is configured with at least one of four transmit beams $B_0$-$B_3$. Each transmit beam is associated with and transmitted through one of $M_p$ CSI-RS resources, where p is an index of the $p^{th}$ procedure of beam management performed by base station 120. $M_p$ can be, for example, 64, as shown in FIG. 3. On the other hand, user equipment (UE), e.g., user device 140, is configured with at least one of four receive beams $b_0$-$b_3$ to receive signals from base station 120.

Base station 120 initially allocates four UE-specific CSI-RSs to be transmitted respectively through four transmit beams $B_0$-$B_3$. In the present example, without limitation, base station 120 transmits beams $B_0$-$B_3$ in a beam-sweeping manner, such as transmitting sequentially from $B_0$ to $B_3$ and/or repeating the transmitting sequence a number of times. Base station 120 allocates each transmit beam one of 64 CSI-RS resources. Base station 120 stores mappings between transmit beams $B_0$-$B_3$ and four allocated CSI-RS resources. In such a configuration, transmit beams $B_0$-$B_3$ are associated with the four UE-specific CSI-RSs and the four allocated CSI-RS resources.

Base station 120 then transmits the configuration of the UE-specific CSI-RSs through radio resource control (RRC) signals to user device 140 (step 310). After receiving the configuration, user device 140 receives signals through receive beams $b_0$-$b_3$ in accordance with the configuration of the UE-specific CSI-RSs.

Base station 120 then transmits the UE-specific CSI-RSs through transmit beams $B_0$-$B_3$ and repeats the transmission four times (step 320). Correspondingly, user device 140 receives and measures RSRPs of the UE-specific CSI-RSs on the allocated CSI-RS resources through receive beams $b_0$-$b_3$. User device 140 can, for example, receive each of transmit beams $B_0$-$B_3$ by four receive beams $b_0$-$b_3$, and measure and record a performance metric of the received UE-specific CSI-RSs on the allocated CSI-RS resources. The performance metric includes, for example, RSRP and reference signal receiving quality (RSRQ). User device 140 also stores mappings between receive beams $b_0$-$b_3$ and the CSI-RS resources.

User device 140 then transmits a CSI and/or a CRI report (CSI/CRI report) to base station 120 (step 330). Base station 120 ranks the measurement results in the CSI/CRI report.

Because user device 140 has received each of transmit beams $B_0$-$B_3$ by receive beams $b_0$-$b_3$, user device 140 can determine one or more of receive beams $b_0$-$b_3$ for receiving each of transmit beams $B_0$-$B_3$. For example, user device 140 chooses receive beam $b_0$ for receiving beamformed signals from transmit beam $B_0$ because a received RSRP by receive beam $b_0$ is better than that by receive beams $b_1$-$b_3$. As a result, shown in FIG. 1, transmit beam $B_0$ and receive beam $b_0$ are paired as BPL 100. BPLs 111, 112, and 122 are also formed by similar procedures.

On the other hand, base station 120 has received the RSRPs of the UE-specific CSI-RSs on the allocated CSI-RS resources in the CSI/CRI report from user device 140. In accordance with the RSRPs in the report, base station 120 can determine one or more of transmit beams $B_0$-$B_3$ for transmitting beamformed signals to user device 140. For example, as shown in FIG. 1, base station 120 can select $B_0$, $B_1$ or $B_2$ for transmitting an aperiodic CSI-RS to user device 140 because the measured RSRPs of UE-specific CSI-RSs that are transmitted by transmit beams $B_0$, $B_1$ and $B_2$ are better than that transmitted by transmit beam $B_3$.

Base station 120 is aware of association between CRIs, beam identities (i.e., transmit beams $B_0$-$B_3$), and MIs. Base station 120 can use one of these parameters to identify or indicate the other associated parameters in accordance with the association. On the other hand, user device 140 is aware of the association between CRIs, beam identities, and MIs. User device 140 can determine one of receive beams $b_0$-$b_3$ for receiving beamformed signals when user device 140 has received one of the CRIs, beam identities (i.e., transmit beams $B_0$-$B_3$), and MIs in accordance with the association.

When base station 120 prepares to transmit beamformed signals to user device 140, base station 120 transmits beam indication information to user device 140. The beam indication information includes, for example, one or more of CRIs, one or more of beam identities (i.e., transmit beams $B_0$-$B_3$), and/or one or more of MIs. Alternatively, the beam indication information can include a timestamp in terms of radio frame number, slot number, and OFDM symbol number that can be used to identify the CSI-RS resource for the beamformed signals. In some embodiments, the beam indication information can include an indication of a BM-RS resource and each BM-RS resource is uniquely corresponding to a transmit beam. The BM-RS resource includes, for example, a CSI-RS resource, an SSB resource, or an SRS resource.

After user device 140 receives beam indication information, user device 140 can adjust receive beams $b_0$-$b_3$ for receiving beamformed signals from base station 120 accordingly. In some embodiments, through the association between CRIs, beam identities (i.e., transmit beams $B_0$-$B_3$), and/or MIs, user device 140 can determine a receive beam in accordance with MIs or CRIs. For example, when user device 140 receives an MI of "2," user device 140 can determine the third receive beam, i.e., receive beam $b_2$, for receiving beamformed signals from base station 120. User device 140 may not need to know that base station 120 transmits by both transmit beams $B_1$ and $B_2$.

For example, as shown in FIG. 3, base station 120 transmits beam indication information to user device 140 by downlink control information (DCI) (step 340). The beam indication information includes two MIs that indicate transmit beams $B_1$ and $B_2$. Base station 120 can transmit, for example, two two-bit MIs of "01" and "10" representing transmit beams $B_1$ and $B_2$ in the DCI to user device 140.

When base station 120 transmits aperiodic CSI-RSs by transmit beams $B_1$ and $B_2$, user device 140 can determine to receive the aperiodic CSI-RSs by receive beam $b_2$ in accordance with BPLs 112 and 122. Base station 120 may transmit aperiodic CSI-RSs by transmit beams $B_1$ and $B_2$ simultaneously or through time divisional multiplexing (TDM), i.e., a beam-sweeping manner. User device 140 can receive the aperiodic CSI-RSs by receive beam $b_2$ that is determined in accordance with the two two-bit MIs of "01" and "10" in the received DCI. User device 140 then measures RSRPs of the aperiodic CSI-RSs on the CSI-RS resources accordingly.

After receiving and measuring the aperiodic CSI-RSs, user device 140 transmits an aperiodic CSI report containing CRIs of the measured CSI-RS resources by receive beam $b_2$ (that is now a transmit beam of user device 140). Base station 120 receives the aperiodic CSI report by transmit beams $B_1$ and $B_2$ (that are now receive beams of base station 120) simultaneously or through TDM.

Figure 4:
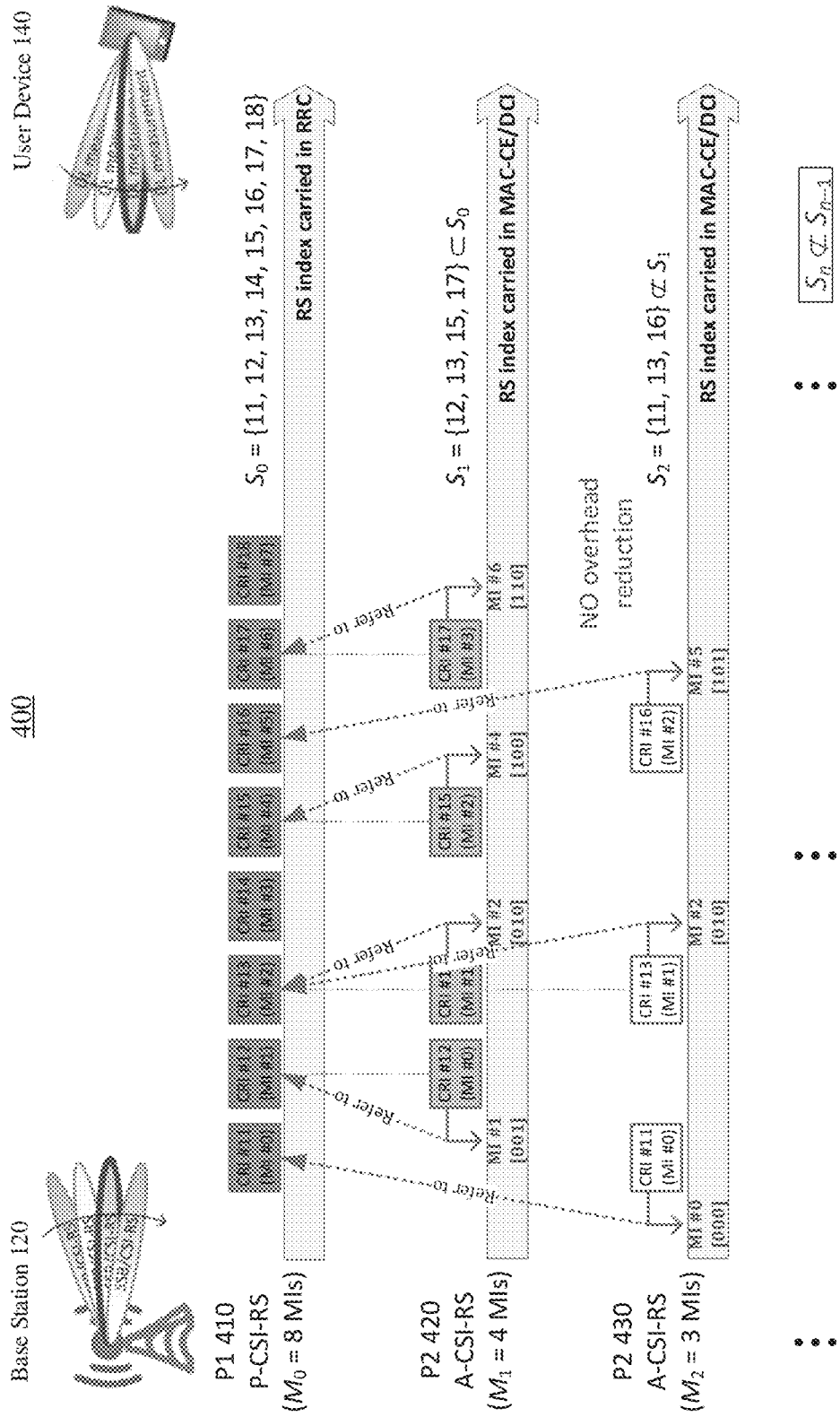
FIG. 4 illustrates an exemplary method for indicating a radio resource to a receiver in a wireless communication system, according to some embodiments of the present application.

FIG. 4 illustrates an exemplary method 400 for indicating a radio resource to a receiver in a wireless communication system, according to some embodiments of the present application. For example, for a P1 procedure 410 as shown in FIG. 4, base station 120 allocates eight periodic CSI-RSs on RS resources indicated by eight resource indicators, CRIs #11 to #18, through RRC signals to user device 140. Thus, eight RS indexes of CSI-RSs #11 to #18 are carried in the RRC signals from base station 120 to user device 140. In P1 procedure 410, base station 120 then transmits the eight periodic CSI-RSs on corresponding CSI-RS resources indicated as CRIs #11 to #18 to user device 140. The eight CRIs can also be denoted by $S_0=\{11, 12, \ldots, 18\}$ as a set of BM-RS resources in P1 procedure 410. Alternatively, $S_0$ is also known the RS measurement set of P1 procedure 410. The BM-RS resources indicated by the eight CRIs can also be referred to as MIs #0, #1, #2, ..., and #7 within the RS measurement set of P1 procedure 410. Thus, as shown in FIG. 4, $M_0$ of P1 procedure 410 includes eight MIs.

On the other hand, user device 140 receives the eight RS indexes in the RRC signals from base station 120. Accordingly, user device 140 can receive and measure the eight periodic CSI-RSs on the corresponding RS resources indicated by the received RS indexes. User device 140 then sends a CSI/CRI report to base station 120, similar to step 330 in FIG. 3. User device 140 may also store measurement results corresponding to the RS indexes, i.e., the CRIs, for determining receive beams $b_0$-$b_3$ and/or a radio resource in a current or subsequent beam management procedures.

P1 410 is the first P1 procedure, and can be used by base station 120 to transmit the CSI-RSs on all configured transmit beams. User device 140 can receive and measure the transmit beams by all receive beams. Accordingly, base station 120 and user device 140 can pair transmit beams $B_0$-$B_3$ of base station 120 and receive beams $b_0$-$b_3$ of user device 140 in accordance with the measurement results. For example, BPLs 100, 111, 112, and 122 can be formed in accordance with the measurement results on the RS radio resources indicated by CRIs #11 to #18. Moreover, the RS radio resources measured in P1 procedure 410 can also be used as reference for indicating one or more RS radio resources to user device 140 for transmissions and/or measurements afterward.

After P1 procedure 410, base station 120 configures a P2 procedure 420 with four aperiodic CSI-RSs (A-CSI-RSs). As shown in FIG. 4, base station 120 allocates four aperiodic CSI-RSs with RS resources at CRIs #12, #13, #15 and #17 in P2 procedure 420. Base station 120 can transmit four RS indexes corresponding to the allocated four aperiodic CSI-RSs and/or the RS resources via a medium access control (MAC) control element (MAC-CE) or a DCI message to user device 140. The RS indexes can be, for example, CRIs #12, #13, #15 and #17. After base station 120 transmits the RS indexes to user device 140 through the MAC-CE or the DCI message, base station 120 transmits the four aperiodic CSI-RSs on the RS resources indicated by CRIs #12, #13, #15 and #17 to user device 140.

On the other hand, user device 140 receives the four RS indexes in the MAC-CE or the DCI message from base station 120. Accordingly, user device 140 receives and measures the four aperiodic CSI-RSs on the corresponding RS resources indicated by the received RS indexes. User device 140 may then send a CSI/CRI report to base station 120 for transmit beam refinement in P2 procedure 420.

The four CRIs can also be denoted by $S_1=\{12, 13, 15, 17\}$ as a set of BM-RS resources in P2 procedure 420. The BM-RS resources of P2 420 is a subset of that of P1 procedure 410, i.e., $S_1=\{12, 13, 15, 17\} \subset S_0=\{11, 12, 13, 14, 15, 16, 17, 18\}$. As shown in FIG. 4, base station 120 can configure the set of the four aperiodic CSI-RSs in P2 procedure 420 by reference to the set of the eight periodic CSI-RSs in P1 procedure 410. That is, by reference to a previous RRC-configured RS resource set, base station 120 can indicate RS resources and/or transmit beams in a current beam management procedure in an efficient way, such as transmitting RS indexes of the RS resources in a MAC-CE or a DCI message to user device 140.

In some embodiments, by reference to a previous RS resource set, base station 120 can indicate RS resources by a set of MIs. That is, base station 120 can transmit a set of MIs as the RS indexes in the MAC-CE or the DCI message to user device 140. For example, the four CRIs #12, #13, #15 and #17 are referred to by a set of four MIs that point to RS resources in the RS resource set of P1 procedure 410. Specifically, when base station 120 allocates the four aperiodic CSI-RSs with CRIs #12, #13, #15 and #17, base station 120 transmits four MIs of "001," "010," "100," and "110" in the MAC-CE or the DCI message to user device 140. by reference to the previous RS measurement set $S_0$, user device 140 interprets the four MIs of "001," "010," "100," and "110" as MIs #1, #2, #4, and #6 in $S_0=\{11, 12, 13, 14, 15, 16, 17, 18\}$, i.e., CRIs #12, #13, #15 and #17.

Base station 120 configures P2 procedure 420 to enable measurements of user device 140 on different transmit beams in P1 procedure 410. According to measurement results in P2 procedure 420, base station 120 can refine transmit beams to user device 140 by selecting different transmit beams.

As shown in FIG. 4, base station 120 further configures a P2 procedure 430 that is allocated with three aperiodic CSI-RSs on RS resources indicated as CRIs #11, #13 and

16. The three CRIs are denoted by an RS measurement set $S_2=\{11, 13, 16\}$. Since the RS measurement set $S_2$ of P2 procedure 430 is not a subset of the RS measurement set $S_1$ of P2 procedure 420, base station 120 may not transmit RS indexes by reference to the previous RS measurements of P2 procedure 420.

Nonetheless, the RS measurement set $S_2$ of P2 procedure 430 is a subset of the previous RRC-configured RS measurement set $S_0$ of P1 procedure 410, base station 120 can indicate three transmit beams or RS resources associated with CRIs #11, #13, and #16 by reference to the RS measurement set $S_0$ of P1 procedure 410. When base station 120 allocates the three aperiodic CSI-RSs on RS resources at CRIs #11, #13, and #16, base station 120 transmits three MIs of "000," "010," and "101" in a MAC-CE or a DCI message to user device 140. By reference to the previous RS measurement set $S_0$, user device 140 interprets the three MIs of "000," "010," and "101" as MIs #0, #2, and #5 in $S_0$, i.e., CRIs #11, #13, and #16.

Figure 5:
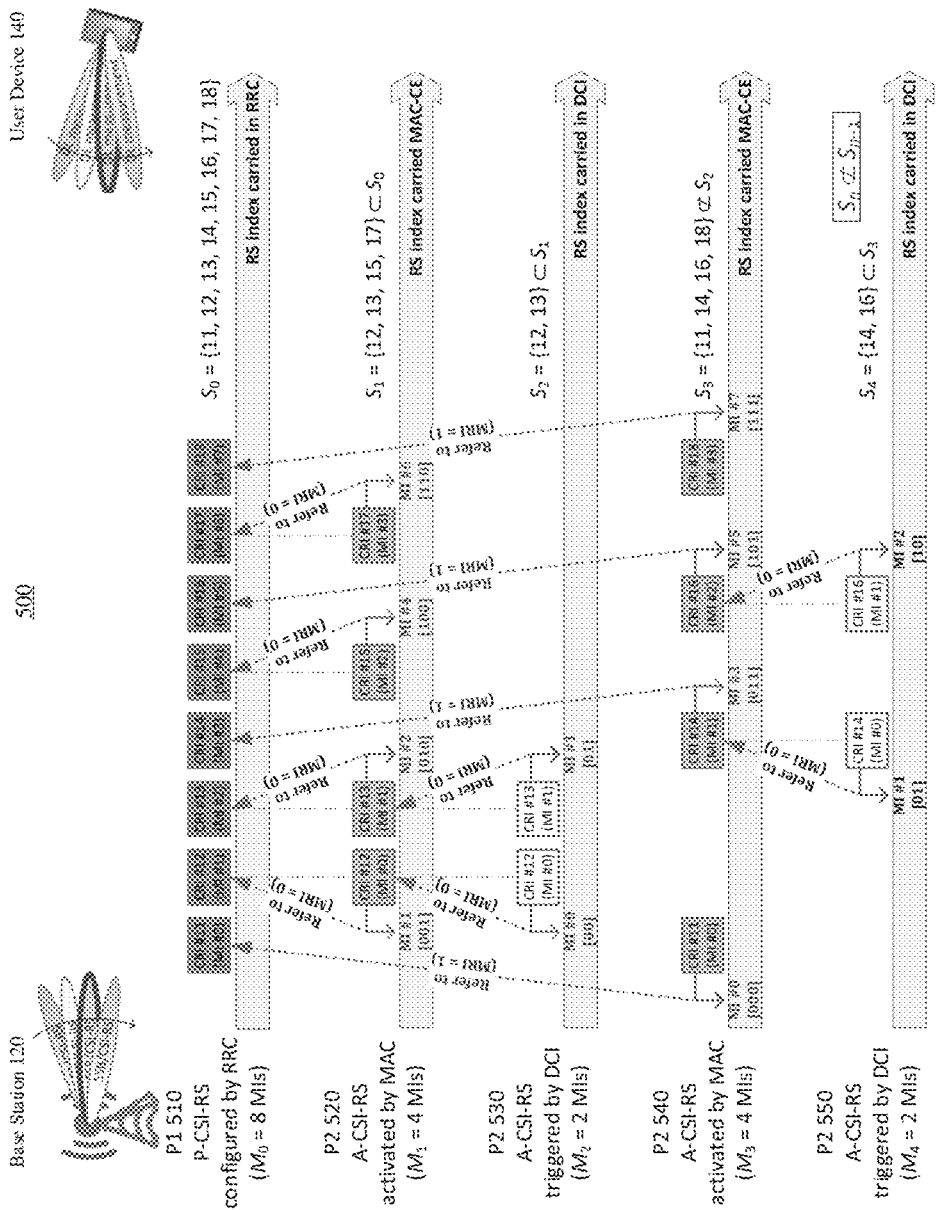
FIG. 5 illustrates an exemplary method for indicating a radio resource to a receiver in a wireless communication system, according to some embodiments of the present application.

FIG. 5 illustrates an exemplary method 500 for indicating a radio resource to a receiver in a wireless communication system, according to some embodiments of the present application. As shown in FIG. 5, base station 120 allocates eight periodic CSI-RSs (P-CSI-RSs) associated with eight RS resources at CRIs #11 to #18 in a P1 procedure 510. When base station 120 configures P1 procedure 510 with user device 140, base station 120 transmits eight RS indexes corresponding to the eight P-CSI-RSs and the RS resources through RRC signals to user device 140. Base station 120 then transmits the eight periodic CSI-RSs on the RS resources denoted as CRIs #11 to #18 to user device 140. The eight CRIs are also denoted by $S_0=\{11, 12, \ldots, 18\}$ as a set of BM-RS resources of P1 procedure 510. $S_0$ is also an RS measurement set of P1 procedure 510. The eight CRIs in P1 procedure 510 can also be referred to as MIs #0-#7. Thus, $M_0$ of P1 procedure 510 includes eight MIs.

On the other hand, user device 140 receives the eight RS indexes in the RRC signals from base station 120. Accordingly, user device 140 receives and measures the eight periodic CSI-RSs on the corresponding RS resources indicated by the received RS indexes. User device 140 then sends a CSI/CRI report to base station 120. User device 140 may also store measurement results corresponding to the RS indexes, i.e., the CRIs, for determining receive beams $b_0$-$b_3$ and/or a radio resource in a current or subsequent beam management procedures.

As shown in FIG. 5, base station 120 also configures a P2 procedure 520 with user device 140. Base station 120 allocates four aperiodic CSI-RSs on RS resources at CRIs #12, #13, #15 and #17 for P2 procedure 520. Base station 120 activates the four aperiodic CSI-RSs at CRIs #12, #13, #15 and #17 by transmitting four RS indexes in a MAC-CE to user device 140. Then, base station 120 transmits four aperiodic CSI-RSs on the RS resources at CRIs #12, #13, #15 and #17 to user device 140.

On the other hand, user device 140 receives the four RS indexes in the MAC-CE from base station 120. Accordingly, user device 140 receives and measures the four aperiodic CSI-RSs on the corresponding RS resources indicated by the received RS indexes. User device 140 may then send a CSI/CRI report to base station 120 for transmit beam refinement in P2 procedure 520.

The four CRIs are also denoted by $S_1=\{12, 13, 15, 17\}$ as a set of BM-RS resources in P2 procedure 520. $S_1$ is also an RS measurement set of P2 procedure 520. Since the RS measurement set of P2 procedure 520 is a subset of that of P1 procedure 510, i.e., $S_1=\{12, 13, 15, 17\} \subset S_0=\{11, 12, \ldots, 18\}$, base station 120 can allocate the four aperiodic CSI-RSs by reference to the previous RS measurement set $S_0$ using a measurement reference indication (MRI). For example, when base station 120 sets the MRI to "0," base station 120 indicates that the last measurement is a measurement reference for P2 procedure 520.

The MRI is defined as a measurement reference indication of which one of previous RS measurements is referred to for indicating a transmit beam, an RS, and/or an RS radio resource. Base station 120 can transmit the MRI in RRC signals, MAC-CEs, and/or DCI messages to provide information about which one of the previous RS measurements is a reference measurement. For example, a one-bit MRI of "0" (i.e., MRI=0) indicates that the last RS measurement is referred to, and the one-bit MRI of "1" (i.e., MRI=1) indicates that the last RRC-configured RS measurement is referred to.

In some embodiments, the RI, the TCI, another transmission configuration indication, or another measurement reference indicator can be an alternative to the MRI in the embodiments.

In P2 procedure 520, when base station 120 intends to activate the four aperiodic CSI-RSs at CRIs #12, #13, #15 and #17, base station 120 transmits four MIs of "001," "010," "100," and "110" and an MRI of "0" in the MAC-CE to user device 140. User device 140 interprets the four MIs by reference to the last RS measurement in accordance with the MRI of "0." By reference to the last RS measurement set $S_0$, user device 140 interprets the four MIs of "001," "010," "100," and "110" as MIs #1, #2, #4, and #6 in $S_0=\{11, 12, 13, 14, 15, 16, 17, 18\}$, i.e., CRIs #12, #13, #15 and #17.

Since the RS measurement set $S_1$ of P2 procedure 520 is a subset of the previous RS measurement set $S_0$, base station 120 can indicate transmit beams and/or allocated CSI-RS resources at CRIs #12, #13, #15 and #17 by reference to the previous RS measurement set $S_0$ using the MRI and MIs. It allows base station 120 to activate aperiodic CSI-RS measurements efficiently by sending corresponding RS indexes and the MRI in the MAC-CE. In P2 procedure 520, the RS indexes are four three-bit MIs that amounts to fewer bits than that of four CRIs #12, #13, #15 and #17.

As shown in FIG. 5, base station 120 further configures a P2 procedure 530 with user device 140. Base station 120 allocates two aperiodic CSI-RSs on RS resources at CRIs #12 and #13. Base station 120 triggers the two aperiodic CSI-RSs at CRIs #12 and #13 by sending two RS indexes in a DCI message to user device 140. Then, base station 120 transmits the two aperiodic CSI-RSs on the RS resources at CRIs #12, #13 to user device 140.

On the other hand, user device 140 receives the two RS indexes in the DCI message from base station 120. Accordingly, user device 140 receives and measures the two aperiodic CSI-RSs on the corresponding RS resources indicated by the received RS indexes. User device 140 may then send a CSI/CRI report to base station 120 for transmit beam refinement in P2 procedure 530.

The two CRIs #12 and #13 can be denoted by $S_2=\{12, 13\}$ as a set of BM-RS resource set in P2 procedure 530. $S_2$ is also an RS measurement set of P2 procedure 530. The RS measurement set of P2 procedure 530 is a subset of $S_0$ in P1 procedure 510 and also a subset of $S_1$ in P2 procedure 520. Base station 120 can select one of the two RS measurement sets $S_0$ and $S_1$ as a reference measurement for indicating transmit beams, RSs, and/or RS radio resources in P2 procedure 530.

For example, base station 120 can transmit two MIs of "00" and "01" and an MRI of "0" in a DCI to refer to the first and second RSs in the RS measurement set $S_1$ of the last measurement. User device 140 interprets the MIs #0 and #1 as the first and second RSs in the reference $S_1=\{12, 13, 15, 17\}$. As a result, user device 140 obtains CRIs #12 and #13 as the RS radio resources, the transmit beams, and/or the CSI-RSs in P2 procedure 530.

By using the MRI, base station 120 may reduce overhead for indicating transmit beams, RSs, and/or corresponding RS radio resources in DCI messages when the allocated CSI-RSs in P2 procedure 530 are a subset of the RS measurement set $S_1$ of the previous measurement in P2 procedure 520. For example, as shown in FIG. 5, base station 120 only needs to transmit two two-bit MIs and a one-bit MRI in the DCI message to user device 140 in P2 procedure 530, rather than two four-bit or five-bit CRIs to represent CRIs #12 and #13.

Base station 120 can also transmit RS indexes by reference to the RS measurement set $S_0$ in P1 procedure 510. In such measurement reference, base station 120 needs to transmit two three-bit MIs and a one-bit MRI in the DCI message. It is still more efficient than transmitting two four-bit or five-bit CRIs to represent CRIs #12 and #13, but not as efficient as by reference to the RS measurement set $S_1$ in P2 procedure 520. Base station 120 can determine which RS measurement set is appropriate, efficient reference, subject to memory capacity of user device 140 as well as base station 120.

As shown in FIG. 5, base station 120 also configures a P2 procedure 540 with user device 140. Base station 120 allocates four aperiodic CSI-RSs on RS resources at CRIs #11, #14, #16 and #18 for P2 procedure 540. Base station 120 activates the four aperiodic CSI-RSs at CRIs #11, #14, #16 and #18 by transmitting four RS indexes in a MAC-CE to user device 140. Then, base station 120 transmits four aperiodic CSI-RSs on the RS resources at CRIs #11, #14, #16 and #18 to user device 140.

On the other hand, user device 140 receives the four RS indexes in the MAC-CE from base station 120. Accordingly, user device 140 receives and measures the four aperiodic CSI-RSs on the corresponding RS resources indicated by the received RS indexes. User device 140 may then send a CSI/CRI report to base station 120 for transmit beam refinement in P2 procedure 540.

The four CRIs are also denoted by $S_3=\{11, 14, 16, 18\}$ as a set of BM-RS resources in P2 procedure 540. $S_3$ is also an RS measurement set of P2 procedure 540. Since the RS measurement set of P2 procedure 540 is not a subset of that of P2 procedure 530 and that of P2 procedure 520, base station 120 may not use either of the two RS measurements in P2 procedure 530 and P2 procedure 520 as a reference measurement. Nonetheless, the RS measurement set $S_3$ is a subset of the RS measurement set $S_0$ of P1 procedure 510, i.e., $S_3=\{11, 14, 16, 18\} \subset S_0=\{11, 12, 13, 14, 15, 16, 17, 18\}$.

Because the RS measurement set of P2 procedure 540 is a subset of that of P1 procedure 510, base station 120 can allocate the four aperiodic CSI-RSs by reference to the previous RRC-configured RS measurement set $S_0$ using an MRI. For example, when base station 120 sets the MRI to "1," base station 120 indicates that the last RRC-configured measurement is a measurement reference for P2 procedure 540. Accordingly, base station 120 transmits four MIs of "000," "011," "101," and "111" and an MRI of "1" in the MAC-CE to user device 140.

On the other hand, when user device 140 receives the four MIs and the MRI of "1," uses device 140 interprets MIs by reference to the RS measurement set $S_0$ of the previous RRC-configured RS measurement in accordance with the MRI of "1." Thus, user device 140 interprets the four MIs in the MAC-CE as MIs #0, #3, #5, and #7 in the previous RRC-configured RS measurement set $S_0=\{11, 12, 13, 14, 15, 16, 17, 18\}$, i.e., CRIs #11, #14, #16, and #18.

In such measurement reference, base station 120 efficiently activates the four aperiodic CSI-RS for indicating transmit beams, RSs, and/or RS radio resources by transmitting four three-bit MIs and a one-bit MRI in the MAC-CE to user device 140. An additional requirement for the measurement reference is that both user device 140 and base station 120 need to store the RS measurement set $S_0$ of P1 procedure 510. It is subject to memory capacity of user device 140 as well as base station 120.

As shown in FIG. 5, base station 120 further configures a P2 procedure 550 with user device 140. Base station 120 allocates two aperiodic CSI-RSs on CSI-RS resources at CRIs #14 and #16. Base station 120 triggers the two aperiodic CSI-RSs at CRIs #14 and #16 by sending two RS indexes in a DCI message to user device 140. Then, base station 120 transmits the two aperiodic CSI-RSs on the RS resources at CRIs #14 and #16 to user device 140.

On the other hand, user device 140 receives the two RS indexes in the DCI message from base station 120. Accordingly, user device 140 receives and measures the two aperiodic CSI-RSs on the corresponding RS resources indicated by the received RS indexes. User device 140 may then send a CSI/CRI report to base station 120 for transmit beam refinement in P2 procedure 550.

The two CRIs #14 and #16 can be denoted by $S_4=\{14, 16\}$ as a set of BM-RS resource set in P2 procedure 550. $S_4$ is also an RS measurement set of P2 procedure 550. The RS measurement set of P2 550 is a subset of $S_0$ in P1 procedure 510 and also a subset of $S_3$ in P2 procedure 540. Base station 120 can select one of two measurement sets $S_0$ and $S_3$ as a reference measurement for indicating transmit beams, RSs, and/or RS radio resources in P2 procedure 550.

For example, base station 120 can transmit two MIs of "01" and "10" and an MRI of "0" in a DCI message to refer to the second and third RSs in the RS measurement set $S_3$ in the last measurement. User device 140 interprets the MIs #1 and #2 as the second and third RSs in the $S_3=\{11, 14, 16, 18\}$. As a result, user device 140 obtains CRIs #14 and #16 as the RS radio resources, the transmit beams, and/or the CSI-RSs in P2 procedure 550.

By using the MRI, base station 120 reduces overhead for indicating transmit beams, RSs, and/or corresponding RS radio resources in DCI messages when the allocated CSI-RSs in P2 procedure 550 are a subset of the RS measurement set $S_3$ in the last measurement. As shown in FIG. 5, base station 120 only needs to transmit two two-bit MIs and a one-bit MRI in the DCI message to user device 140 in P2 procedure 550, rather than two five-bit CRIs to represent CRIs #14 and #16.

Alternatively, base station 120 can transmit RS indexes by reference to the RS measurement set $S_0$. In such measurement reference, base station 120 needs to transmit two three-bit MIs and a one-bit MRI in the DCI message. It is still more efficient than transmitting two five-bit CRIs to represent CRIs #12 and #13, but not as efficient as by reference to the RS measurement set $S_3$ of P2 procedure 540. Base station 120 can determine which RS measurement set is appropriate, efficient reference, subject to memory capacity of user device 140 and base station 120.

In some embodiments, an indicator state with N bits is used to indicate reference to one or more previously transmitted DL/UL RSs which is spatially QCL with at least one DL/UL RS port group for user device 140 for the purpose of indicating transmit beams and/or receiving control and data channels. The reference to one or more previously transmitted DL/UL RSs can be indicated by an SSB resource indicator (SSBRI), a CSI-RS resource indicator (CRI), and/or an SRS resource indicator (SRI). Those referenced DL/UL RSs are also defined as referenced DL/UL RS antenna ports. Those referenced DL/UL RSs can be, for example, CSI-RSs, SSBs, and SRSs, and they are QCL with at least one DL/UL RS for user device 140. The quasi-co-located DL/UL RS port is defined as a targeted DL/UL RS antenna port, and can be, for example, a DL CSI-RS, a UL SRS, or a DL/UL DM-RS.

For example, the indicator state is an RI state with two bits to reference to a transmitted CSI-RS that is spatially QCL with a DL DM-RS port group for user device 140 for the purpose of indicating transmit beams or receiving a physical downlink control channel (PDCCH) and/or a physical downlink shared channel (PDSCH). A plurality of parameters of the referenced DL RS antenna port can be used as reference for the targeted DL RS antenna port. For example, Doppler shift, Doppler spread, average delay, delay spread, and spatial Rx parameter of the referenced CSI-RS antenna port can be used for the targeted DM-RS antenna port in PDSCH reception.

The indicator state is associated with at least one reference index of a DL/UL RS, such as SSBRI, CRI, and SRI. Each reference index of the DL/UL RS can be associated with a given resource setting identity (ID) j characterizing a given referenced DL/UL RS type to describe time-domain behavior. For example, the resource setting ID j can be used to indicate the referenced DL/UL RS type as follows:

j=0: SSB;
j=1: periodic CSI-RS (P-CSI-RS);
j=2: semi-persistent CSI-RS (SP-CSI-RS);
j=3: aperiodic CSI-RS (A-CSI-RS); and
j=4: SRS.

A number of indicator states can be associated with at least one of previous RS resource measurements. The number of indicator states stands for a reference sliding window in an RRC connected mode, and is subject to memory capacity of user device 140 and base station 120. The indicator state can flexibly indicate L previous RS resource measurements, where L>=1, where L=1 as a default value.

Base station 120 can use different indicator states to dynamically assign any combination of RSs using the same type of beam indication, such as SSBs, P-CSI-RSs, SP-CSI-RSs, A-CSI-RSs, and/or SRSs. Base station 120 can also use different indicator states to dynamically assign RSs, control channels, and/or data channels to be transmitted over different beams. Base station 120 can further use different indicator states to dynamically switch between wide beams and narrow beams. The wider beams provide more robust transmission than that of the narrow beams. On the other hand, the narrow beams provide higher beamforming gain than that of the wider beams. Base station 120 can send L by an RRC or MAC-CE message to user device 140. Alternatively, L can be a fixed value, e.g., L=1.

An RS resource measurement index: n−i, 1≤i≤M, can be used for determining which one of previous RS resource measurements is referenced in a reference indicator state for indicating transmit beams, RSs, and or RS radio resources in an RRC connected mode, where M stands for a maximum number of previous RS resource measurements that can be referenced. Base station 120 can transmit i in an RRC message or a MAC-CE to indicate which one of previous RS resource measurements is referenced for a current measurement, beam indication, or indication of an RS radio resource.

Moreover, a one-bit RS index to reference indicator association can be signaled in an RRC, MAC-CE, and/or DCI message. For example, base station 120 explicitly transmits one or more RS indexes through the RRC message or the MAC-CE to user device 140 if the current RS resources is a subset of a referenced RS resource measurement. The one-bit RS index to reference indicator association can be set as "1" to indicate that the reference indicator is with explicit RS indexes. Alternatively, base station 120 can implicitly indicate RS indexes to user device 140 through an RRC message or a MAC-CE if current RS resources for beam indication and/or indication of RS radio resources is a full set of previous RS resource measurement. That is, base station 120 does not need to transmit any RS indexes in the RRC or MAC-CE message to user device 140 because the full RS measurement set of the referenced measurement is indicated. User device 140 can obtain the RS resources in accordance with those in the referenced, previous measurement.

In some embodiments, an MRI state of two bits can indicate one of latest four RS measurements as reference for indicating transmit beams and/or RS radio resources. Alternatively, the two-bit MRI can indicate that one of the following four previous RS measurements as reference:

0: the last RS measurement.
1: the previous RRC-configured, periodic RS measurement.
2: the previous MAC-CE-activated, semi-persistent RS measurement.
3: the previous DCI-triggered, aperiodic RS measurement.

FIG. 6 is an exemplary table indicating a radio resource to a receiver in a wireless communication system, according to some embodiments of the present application. In accordance with memory capacity of user device 140, user device 140 has a maximum number of previous RS measurements that can be used as reference for indicating RS radio resources and/or transmit beams. For example, as shown in FIG. 6, M is a maximum number of previous RS measurements, where M=32. That is, user device 140 can support a maximum number of thirty-two previous RS measurements. In other words, user device 140 has a sliding reference window of thirty-two previous RS measurements that can be used as reference for indicating RS radio resources and/or transmit beams in a current transmission and/or measurement.

As shown in the first column of the table in FIG. 6, an MRI includes three bits, and is used as a reference indicator in a DCI message. The three-bit MRI can include eight reference indicator states for indicating RS radio resources and/or transmit beams. A maximum number of reference indicator states is denoted by K, where K=8.

As shown in FIG. 6, a reference indicator state "0" indicates reference to sixteen SSBs. RS indexes of SSBs are referred to as SSB time indexes (SSB TIs) or resource indexes (SSBRIs) from 0 to 15. The reference is to a full set of RS resources in the referenced measurement. An RS type is defined by a resource setting ID: j. The resource setting ID of SSB is referred to by j=0, as shown in FIG. 6. A measurement index of the reference indicator state "0" indicates reference to the previous $22^{nd}$ RS measurement during initial access for spatial quasi-co-located with a current DL RS. Since the full set of SSB time indexes, i.e., TI=0-15, would be used as the reference in the reference indicator state "0," an RS index to reference indicator association is implicit, and the RS index to reference indicator association can be represented by a one-bit association indicator of "0," implying that the RS indexes of the reference indicator state of "0" are implicitly signaled to user device 140. Thus, base station 120 does not need to transmit any RS indexes to user device 140.

As shown in the table of FIG. 6, a reference indicator state of the MRI is associated with an RS type (i.e., a resource setting ID, j), a measurement index (i.e., n−i, 1≤i≤M), an RS index to reference indicator association, and an RS index. For example, the reference indicator state "0" is associated with the RS type of "SSB" (i.e., j=0), the measurement index of "n−22" (i.e., the previous $22^{nd}$ RS measurement), the RS index to reference indicator association of "implicit" (i.e., the association indicator=0), and the RS indexes of "TI=0-15" (i.e., a full set of RS resources). When user device 140 obtains the reference indicator state from base station 120, user device 140 can determine the other parameters in the same entry of the table in accordance with the associations between them. Base station 120 needs to transmit and update the table through RRC signals or MAC-CEs before user device 140 applies the table for receiving indication of RS radio resources and/or transmit beams.

As another example, as shown in the table of FIG. 6, a reference indicator state "2" indicates reference to two previous measurements, i.e., L=2. For the first referenced measurement, the reference indicator state "2" is associated with the RS type of "P-CSI-RS" (i.e., j=1), the measurement index of "n−16" (i.e., the previous $16^{th}$ RS measurement), the RS index to reference indicator association of "explicit" (i.e., the association indicator=1), and the RS indexes of "$CRI_1$=3 and 4" (i.e., indicated RS resources). For the second referenced measurement, the reference indicator state "2" is associated with the RS type of "SP-CSI-RS" (i.e., j=2), the measurement index of "n−5" (i.e., the previous $5^{th}$ RS measurement), the RS index to reference indicator association of "implicit" (i.e., the association indicator=0), and the RS indexes of "$CRI_2$=22 and 23" (i.e., a full set of RS resources).

Because $CRI_1$ is a subset of the RS measurement set in the previous $16^{th}$ RS measurement, and $CRI_2$ is a full set of the RS measurement set in the previous $5^{th}$ RS measurement in reference indicator state "2," the RS index to reference indicator associations of the two referenced measurements are respectively set as explicit and implicit. The association indicators of the two referenced measurements are set as "1" and "0" respectively. The association indicator of "1" for the first referenced measurement indicates that base station 120 explicitly transmits two RS indexes of CRIs #3 and #4 to user device 140. After receiving the reference indicator state of "2" and the association indicator of "1," user device 140 receives the two RS indexes and interprets the two RS indexes as CRIs #3 and #4. The association indicator of "0" for the second referenced measurement indicates that base station 120 implicitly transmits the full RS measurement set in the previous $5^{th}$ RS measurement to user device 140. In other words, base station 120 does not transmit RS indexes. Thus, after receiving the reference indicator state of "2" and the association indicator of "0," user device 140 uses the full RS measurement set in the previous $5^{th}$ RS measurement as indicated RS indexes, i.e., CRIs #22 and #23.

As another example, as shown in the table of FIG. 6, the reference indicator state "4" is associated with the RS type of "A-CSI-RS" (i.e., j=3), the measurement index of "n−8" (i.e., the previous $8^{th}$ RS measurement), the RS index to reference indicator association of "implicit" (i.e., the association indicator=0), and the RS indexes of "CRI=9, 19, 20" (i.e., a full set of RS resources). When user device 140 obtains the reference indicator state of "4," user device 140 can determine that the RS radio resources for current transmission or measurement are CRIs #9, #19, and #20 by reference to the full RS measurement set in the previous $8^{th}$ RS measurement.

Base station 120 needs to transmit and update the table through RRC signals or MAC-CEs to user device 140 before user device 140 applies the table for indication of transmit beams and/or RS radio resources. In some embodiments, when the RS index to reference indicator association is implicit, the full set of RS indexes can be either a full RS measurement set configured by base station 120 or an up-to-date full RS measurement set reported by user device 140.

Figure 7:
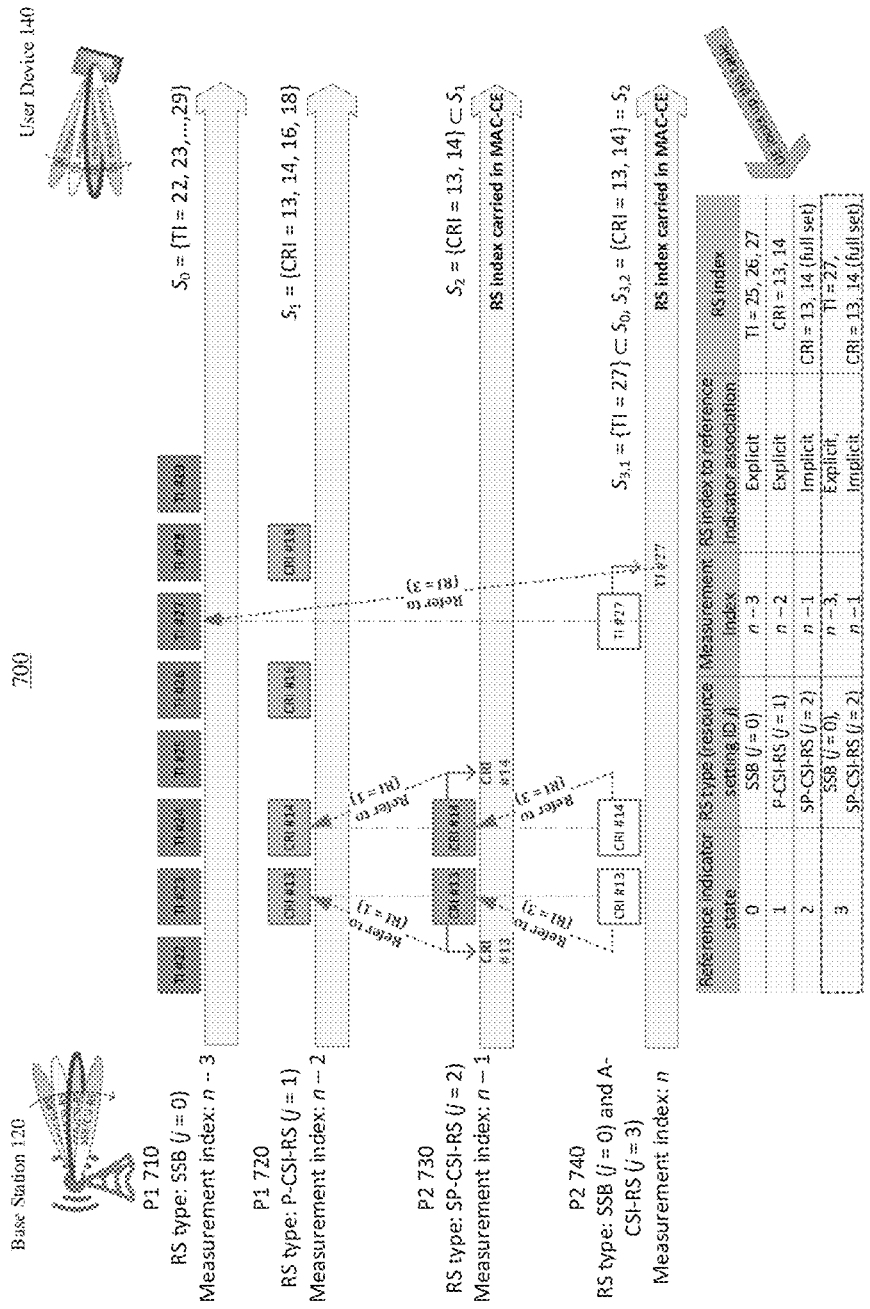
FIG. 7 illustrates an exemplary method for indicating a radio resource to a receiver in a wireless communication system, according to some embodiments of the present application.

FIG. 7 illustrates an exemplary method 700 for indicating a radio resource to a receiver in a wireless communication system, according to some embodiments of the present application. Base station 120 configures and updates a table in FIG. 7 with user device 140 through RRC signals and/or MAC-CEs before user device 140 applies the table for receiving indication of RS radio resources and/or transmit beams. When user device 140 receives a reference indicator state from base station 120, user device 140 can obtain an associated RS type, an associated measurement index, an associated RS index to reference indicator association, and/or one or more associated RS indexes in accordance with an entry of the table corresponding to the received reference indicator state.

In the table of FIG. 7, an RI can be used to indicate a reference indicator state through a MAC-CE or a DCI message. The RI includes four reference indicator states for indicating RS radio resources and/or transmit beams. A maximum number of reference indicator states is denoted by K, where K=4.

The table shown in FIG. 7 is at a stage of configuring a P2 procedure 740. The measurement indexes referring to previous a P1 procedure 710, a P1 procedure 720, and a P2 procedure 730 are denoted as n−3, n−2, and n−1, respectively, relative to measurement index "n" of P2 procedure 740. Base station 120 can use one of the reference indicator state 0, 1, 2, and 3 to indicate transmit beams and/or RS resources, and base station 120 decides to select the state in a dashed line rectangle to indicate transmit beams and/or RS resources in P2 procedure 740.

As shown in the table of FIG. 7, a reference indicator state of the RI is associated with an RS type (i.e., a resource setting ID, j), a measurement index (i.e., n−i, 1≤i≤M), an RS index to reference indicator association, and one or more RS indexes. For example, the reference indicator state of "0" is associated with the RS type of "SSB" (i.e., j=0), the measurement index of "n−3" (i.e., the previous $3^{rd}$ RS measurement), the RS index to reference indicator association of "explicit" (i.e., the association indicator=1), and the RS indexes of "TI=25, 26, 27" (i.e., indicated RS resources).

As shown in FIG. 7, base station 120 allocates eight SSBs associated with eight RS resources at TIs #22 to #29 in P1 procedure 710. When base station 120 configures P1 procedure 710 with user device 140, base station 120 transmits eight RS indexes corresponding to the eight SSBs and the RS resources through RRC signals to user device 140. Base station 120 then transmits signals on the eight SSBs at the RS resources denoted as TIs #22 to #29 to user device 140. The eight TIs can also be denoted by $S_0$={TI: 22, 23, . . . , 29} as a set of BM-RS resources of P1 procedure 710. $S_0$ is also an RS measurement set of P1 procedure 710. Alternatively, the eight SSB TIs can also be referred to as SSBRIs #22 to #29.

On the other hand, user device 140 receives the eight RS indexes in the RRC signals from base station 120. Accordingly, user device 140 receives and measures the eight SSBs on the corresponding RS resources indicated by the received RS indexes. User device 140 then sends an SSB/SSBRI report to base station 120. User device 140 may also store measurement results corresponding to the RS indexes, i.e., the SSBRIs, for determining receive beams $b_0$-$b_3$ and/or a radio resource in a current or subsequent beam management procedures.

As shown in FIG. 7, base station 120 also allocates four periodic CSI-RSs (P-CSI-RSs) associated with four RS resources at CRIs #13, #14, #16, and #18 in P1 procedure 720. When base station 120 configures P1 procedure 720 with user device 140, base station 120 transmits four RS indexes corresponding to the four P-CSI-RSs and the RS resources through RRC signals to user device 140. Base station 120 then transmits the four periodic CSI-RSs on the RS resources denoted as CRIs #13, #14, #16, and #18 to user device 140. The four CRIs are also denoted by $S_1$={CRI: 13, 14, 16, 18} as a set of BM-RS resources of P1 procedure 720. $S_1$ is also an RS measurement set of P1 procedure 720.

On the other hand, user device 140 receives the four RS indexes in the RRC signals from base station 120. Accordingly, user device 140 receives and measures the four periodic CSI-RSs on the corresponding RS resources indicated by the received RS indexes. User device 140 then sends a CSI/CRI report to base station 120. User device 140 may also store measurement results corresponding to the RS indexes, i.e., the CRIs, for determining receive beams $b_0$-$b_3$ and/or a radio resource in a current or subsequent beam management procedures.

As shown in FIG. 7, base station 120 further allocates two semi-persistent CSI-RSs (SP-CSI-RSs) associated with two RS resources at CRIs #13 and #14 in P2 procedure 730. When base station 120 configures P2 procedure 730 with user device 140, base station 120 activates two RS indexes corresponding to the two SP-CSI-RSs and the RS resources through a MAC-CE to user device 140. Base station 120 then transmits the two periodic CSI-RSs on the RS resources denoted as CRIs #13 and #14 to user device 140.

The two CRIs are also denoted by $S_2$={CRI: 13, 14} as a set of BM-RS resources of P2 procedure 730. $S_2$ is also an RS measurement set of P2 procedure 730. Since the RS measurement set $S_2$ of P2 procedure 730 is a subset of $S_1$ in P1 procedure 720. Base station 120 can indicate transmit beams and/or allocated CSI-RS resources at CRIs #13 and #14 by reference to the RS measurement set $S_1$ of the previous RS measurement in P1 procedure 720 using the RI and RS indexes.

As shown in the table of FIG. 7, base station 120 configures the RI=1 for reference to measurement resources in P1 procedure 720 and the RS measurement set $S_1$ thereof. As illustrated in the second entry of the table, base station 120 configures the reference indicator state of "1" (i.e., RI=1) to be associated with the RS type of "P-CSI-RS" (i.e., j=1), the measurement index of "n−2" (i.e., the previous $2^{nd}$ RS measurement relative to P2 procedure 740, i.e., P1 procedure 720), the RS index to reference indicator association of "explicit" (i.e., the association indicator=1), and the RS indexes of "CRI=13 and 14 (full set)" (i.e., a full set of RS resources). Thus, base station 120 transmits the two RS indexes as either CRIs #13 and #14 or MIs #0 and #1 in the MAC-CE to user device 140, as illustrated in methods 400 and 500 in FIGS. 4 and 5.

On the other hand, after receiving the reference indicator state of "1" and obtaining the association indicator of "1," user device 140 obtains the two RS indexes, i.e., CRIs #13 and #14 or MIs #0 and #1, as CRIs #13 and #14 by reference to the RS measurement set $S_1$ in P1 procedure 720. Accordingly, user device 140 receives and measures the two semi-persistent CSI-RSs on the corresponding RS resources indicated by the received RS indexes. User device 140 may then send a CSI/CRI report to base station 120 for transmit beam refinement in P2 procedure 730.

As shown in FIG. 7, base station 120 also allocates one SSB and two aperiodic CSI-RSs (A-CSI-RSs) associated with an RS resource at TI #27 and two RS resources at CRIs #13 and #14 in a P2 procedure 740. When base station 120 configures P2 procedure 740 with user device 140, base station 120 activates an RS index corresponding to SSB TI #27 and two RS indexes corresponding to the two A-CSI-RSs at CRIs #13 and #14 in a MAC-CE to user device 140.

The SSB TI #27 is also denoted by $S_{3,1}$={TI: 27} as a set of BM-RS resources of P2 procedure 740. $S_{3,1}$ is also part of an RS measurement set of P2 procedure 740. The two CRIs are also denoted by $S_{3,2}$={CRI: 13, 14} as a set of BM-RS resources of P2 procedure 740. $S_{3,2}$ is also part of the RS measurement set of P2 procedure 740.

Since $S_{3,1}$ of P2 procedure 740 is a subset of $S_0$ in P1 procedure 710, base station 120 can indicate transmit beams and/or allocated RS resources at SSB TI #27 by reference to the RS measurement set $S_0$ of the previous third RS measurement in P1 procedure 710 using the RI and RS indexes. As shown in the table of FIG. 7, base station 120 configures and updates an entry of the reference indicator state of "3" to be associated with the RS type of "SSB" (i.e., j=0), the measurement index of "n−3" (i.e., the previous $3^{rd}$ RS measurement), the RS index to reference indicator association of "explicit" (i.e., the association indicator=1), and the RS indexes of "TI=27" (i.e., indicated RS resources). Thus, base station 120 decides to indicate RI=3, and transmits the RS index as either TI #27 (i.e., SSBRI #27) or MIs #5 in the MAC-CE to user device 140, as illustrated in methods 400 and 500 in FIGS. 4 and 5.

Moreover, since the RS measurement set $S_{3,2}$ of P2 procedure 740 is a subset of $S_2$ in P2 procedure 730, base station 120 can indicate transmit beams and/or allocated CSI-RS resources at CRIs #13 and #14 by reference to the RS measurement set $S_2$ of the previous RS measurement in P2 procedure 730 using the RI and RS indexes. As shown in the table of FIG. 7, base station 120 configures and updates the entry of the reference indicator state of "3" to be also associated with the RS type of "SP-CSI-RS" (i.e., j=2), the measurement index of "n−1" (i.e., the previous RS measurement), the RS index to reference indicator association of "implicit" (i.e., the association indicator=0), and the RS indexes of "CRI=13 and 14" (i.e., a full set of RS resources). Thus, base station 120 decides to indicate RI=3 as noted above, but does not transmit the two RS indexes corresponding to CRIs #13 and #14 in the MAC-CE to user device 140.

After receiving the reference indicator state of "3" and obtaining the first association indicator of "1," user device 140 receives the RS index, either SSBRI #27 or MI #5, as illustrated in methods 400 and 500 in FIGS. 4 and 5. Base station 120 then interprets the RS index as SSB TI #27 by reference to the previous $3^{rd}$ RS measurement set $S_0$={TI: 22, 23, ..., 29}. Moreover, after receiving the reference indicator state of "3" and obtaining the second association indicator of "0," user device 140 obtains the two RS indexes as CRIs #13 and #14 by reference to the previous full RS measurement set $S_2=\{13, 14\}$. User device 140 does not need to receive the RS indexes corresponding to CRIs #13 and #14 in the MAC-CE.

Figure 8:
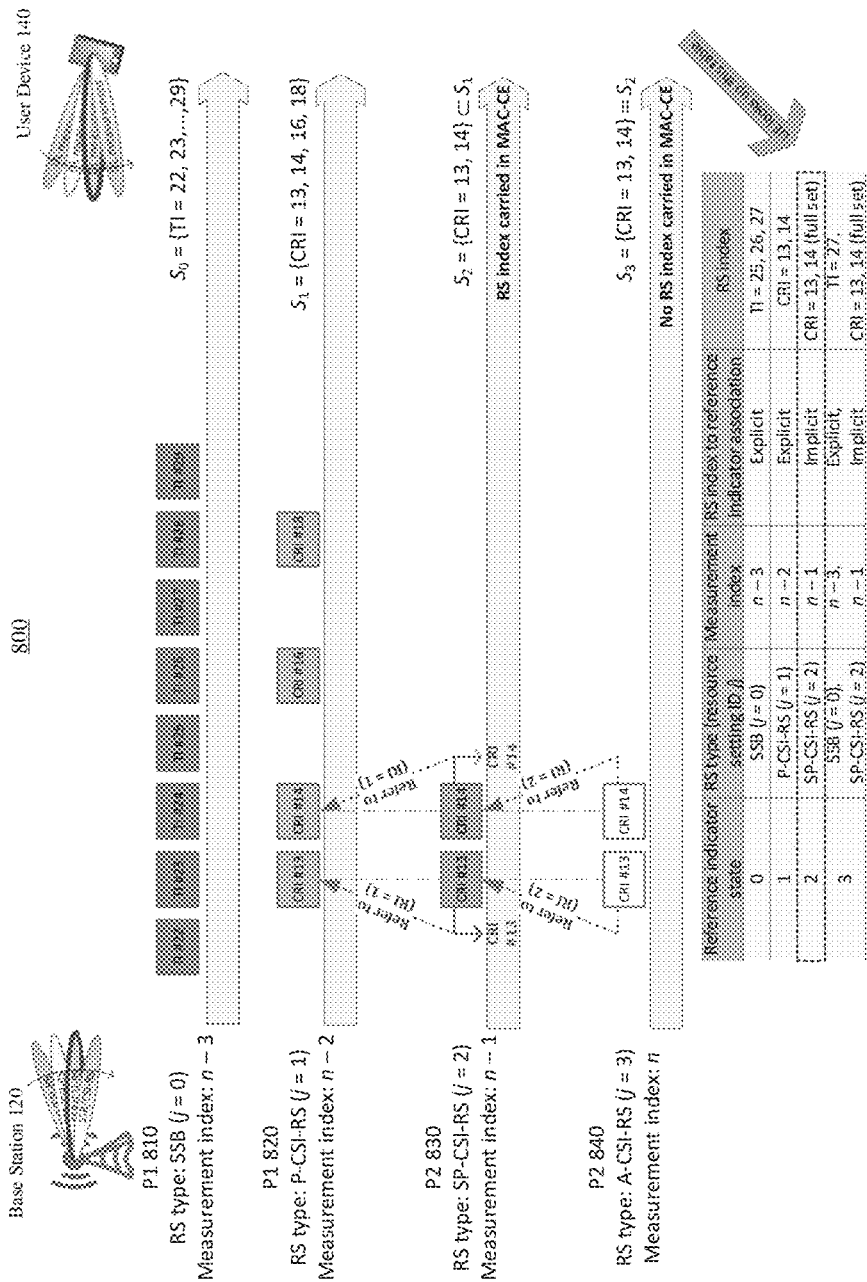
FIG. 8 illustrates an exemplary method for indicating a radio resource to a receiver in a wireless communication system, according to some embodiments of the present application.

FIG. 8 illustrates an exemplary method 800 for indicating a radio resource to a receiver in a wireless communication system, according to some embodiments of the present application. Base station 120 configures and updates a table in FIG. 8 with user device 140 through RRC signals and/or MAC-CEs before user device 140 applies the table for receiving indication of RS radio resources and/or transmit beams. When user device 140 receives a reference indicator state from base station 120, user device 140 can obtain an associated RS type, an associated measurement index, an associated RS index to reference indicator association, and/or one or more associated RS indexes in accordance with an entry of the table corresponding to the received reference indicator state.

In the the table of FIG. 8, an RI can be used to indicate a reference indicator state through a MAC-CE or a DCI message. The RI includes four reference indicator states for indicating RS radio resources and/or transmit beams. A maximum number of reference indicator states is denoted by K, where K=4.

The table shown in FIG. 8 is at a stage of configuring a P2 procedure 840. The measurement indexes referring to previous a P1 procedure 810, a P1 procedure 820, and a P2 procedure 830 are denoted as n−3, n−2, and n−1, respectively, relative to measurement index "n" of P2 procedure 840. Base station 120 can use one of the reference indicator state 0, 1, 2, and 3 to indicate transmit beams and/or RS resources, and base station 120 decides to select the state in a dashed line rectangle to indicate transmit beams and/or RS resources in P2 procedure 840.

As shown in the table of FIG. 8, a reference indicator state of the RI is associated with an RS type (i.e., a resource setting ID, j), a measurement index (i.e., n−i, 1≤i≤M), an RS index to reference indicator association, and one or more RS indexes. For example, the reference indicator state of "0" is associated with the RS type of "SSB" (i.e., j=0), the measurement index of "n−3" (i.e., the previous $3^{rd}$ RS measurement), the RS index to reference indicator association of "explicit" (i.e., the association indicator=1), and the RS indexes of "TI=25, 26, 27" (i.e., indicated RS resources).

As shown in FIG. 8, base station 120 allocates eight SSBs associated with eight RS resources at TIs #22 to #29 in a P1 procedure 810. When base station 120 configures P1 procedure 810 with user device 140, base station 120 transmits eight RS indexes corresponding to the eight SSBs and the RS resources through RRC signals to user device 140. Base station 120 then transmits signals on the eight SSBs at the RS resources denoted as TIs #22 to #29 to user device 140. The eight TIs can also be denoted by $S_0=\{TI: 22, 23, \ldots, 29\}$ as a set of BM-RS resources of P1 procedure 810. So is also an RS measurement set of P1 procedure 810. Alternatively, the eight SSB TIs can also be referred to as SSBRIs #22 to #29.

On the other hand, user device 140 receives the eight RS indexes in the RRC signals from base station 120. Accordingly, user device 140 receives and measures the eight SSBs on the corresponding RS resources indicated by the received RS indexes. User device 140 then sends an SSB/SSBRI report to base station 120. User device 140 may also store measurement results corresponding to the RS indexes, i.e., the SSBRIs, for determining receive beams $b_0$-$b_3$ and/or a radio resource in a current or subsequent beam management procedures.

As shown in FIG. 8, base station 120 also allocates four periodic CSI-RSs (P-CSI-RSs) associated with four RS resources at CRIs #13, #14, #16, and #18 in a P1 procedure 820. When base station 120 configures P1 procedure 820 with user device 140, base station 120 transmits four RS indexes corresponding to the four P-CSI-RSs and the RS resources through RRC signals to user device 140. Base station 120 then transmits the four periodic CSI-RSs on the RS resources denoted as CRIs #13, #14, #16, and #18 to user device 140. The four CRIs are also denoted by $S_1=\{CRI: 13, 14, 16, 18\}$ as a set of BM-RS resources of P1 procedure 820. $S_1$ is also an RS measurement set of P1 procedure 820.

On the other hand, user device 140 receives the four RS indexes in the RRC signals from base station 120. Accordingly, user device 140 receives and measures the four periodic CSI-RSs on the corresponding RS resources indicated by the received RS indexes. User device 140 then sends a CSI/CRI report to base station 120. User device 140 may also store measurement results corresponding to the RS indexes, i.e., the CRIs, for determining receive beams $b_0$-$b_3$ and/or a radio resource in a current or subsequent beam management procedures.

As shown in FIG. 8, base station 120 further allocates two semi-persistent CSI-RSs (SP-CSI-RSs) associated with two RS resources at CRIs #13 and #14 in a P2 procedure 830. When base station 120 configures P2 procedure 830 with user device 140, base station 120 activates two RS indexes corresponding to the two SP-CSI-RSs and the RS resources through a MAC-CE to user device 140. Base station 120 then transmits the two periodic CSI-RSs on the RS resources denoted as CRIs #13 and #14 to user device 140.

The two CRIs are also denoted by $S_2=\{CRI: 13, 14\}$ as a set of BM-RS resources of P2 procedure 830. $S_2$ is also an RS measurement set of P2 procedure 830. Since the RS measurement set $S_2$ of P2 procedure 830 is a subset of $S_1$ in P1 procedure 820, base station 120 can indicate transmit beams and/or allocated CSI-RS resources at CRIs #13 and #14 by reference to the RS measurement set $S_1$ of the previous RS measurement in P1 procedure 820 using the RI and RS indexes.

As shown in the table of FIG. 8, base station 120 configures the RI=1 for reference to measurement resources in P1 procedure 820 and the RS measurement set $S_1$ thereof. As illustrated in the second entry of the table, base station 120 configures of the reference indicator state of "1" (i.e., RI=1) to be associated with the RS type of "P-CSI-RS" (i.e., j=1), the measurement index of "n−2" (i.e., the previous $2^{nd}$ RS measurement relative to P2 procedure 840, i.e., P1 procedure 820), the RS index to reference indicator association of "explicit" (i.e., the association indicator=1), and the RS indexes of "CRI=13 and 14 (full set)" (i.e., a full set of RS resources). Thus, base station 120 transmits the two RS indexes as either CRIs #13 and #14 or MIs #0 and #1 in the MAC-CE to user device 140, as illustrated in methods 400 and 500 in FIGS. 4 and 5.

On the other hand, after receiving the reference indicator state of "1" and obtaining the association indicator of "1," user device 140 obtains the two RS indexes, i.e., CRIs #13 and #14 or MIs #0 and #1, as CRIs #13 and #14 by reference to the RS measurement set $S_1$ in P1 procedure 820. Accordingly, user device 140 receives and measures the two semi-persistent CSI-RSs on the corresponding RS resources indicated by the received RS indexes. User device 140 may then send a CSI/CRI report to base station 120 for transmit beam refinement in P2 procedure 830.

As shown in FIG. 8, base station 120 also allocates two aperiodic CSI-RSs (A-CSI-RSs) associated with two RS resources at CRIs #13 and #14 in P2 procedure 840. When base station 120 configures P2 procedure 840 with user device 140, base station 120 activates two RS indexes corresponding to the two A-CSI-RSs at CRIs #13 and #14 in a MAC-CE to user device 140.

The two CRIs are also denoted by $S_3=\{CRI: 13, 14\}$ as a set of BM-RS resources of P2 procedure 840. $S_3$ is also an RS measurement set of P2 procedure 840. Since the RS measurement set $S_3$ of P2 procedure 840 is a full set of $S_2$ in P2 procedure 830, base station 120 can indicate transmit beams and/or allocated CSI-RS resources at CRIs #13 and #14 by reference to the RS measurement set $S_2$ of the previous RS measurement in P2 procedure 830 using the RI and RS indexes.

In accordance with the table of FIG. 8, base station 120 can indicate the reference indicator state of "2" to user device 140. Base station 120 decides to transmit reference indicator state of "2," i.e., RI=2, in the MAC-CE to user device 140. User device 140 can then obtain the RS type of "SP-CSI-RS" (i.e., j=2), the measurement index of "n−1" (i.e., the previous RS measurement), the RS index to reference indicator association of "implicit" (i.e., the association indicator=0), and the RS indexes of "CRI=13 and 14 (full set)" (i.e., a full set of RS resources). Thus, base station 120 only transmits RI=2, but does not transmit the two RS indexes corresponding to CRIs #13 and #14 in the MAC-CE.

After receiving the reference indicator state of "2" and obtaining the association indicator of "0," user device 140 obtains the two RS indexes as CRIs #13 and #14 by reference to the full RS measurement set in the previous full RS measurement set $S_2=\{13, 14\}$. User device 140 does not need to receive the RS indexes corresponding to CRIs #13 and #14 in the MAC-CE.

Figure 9:
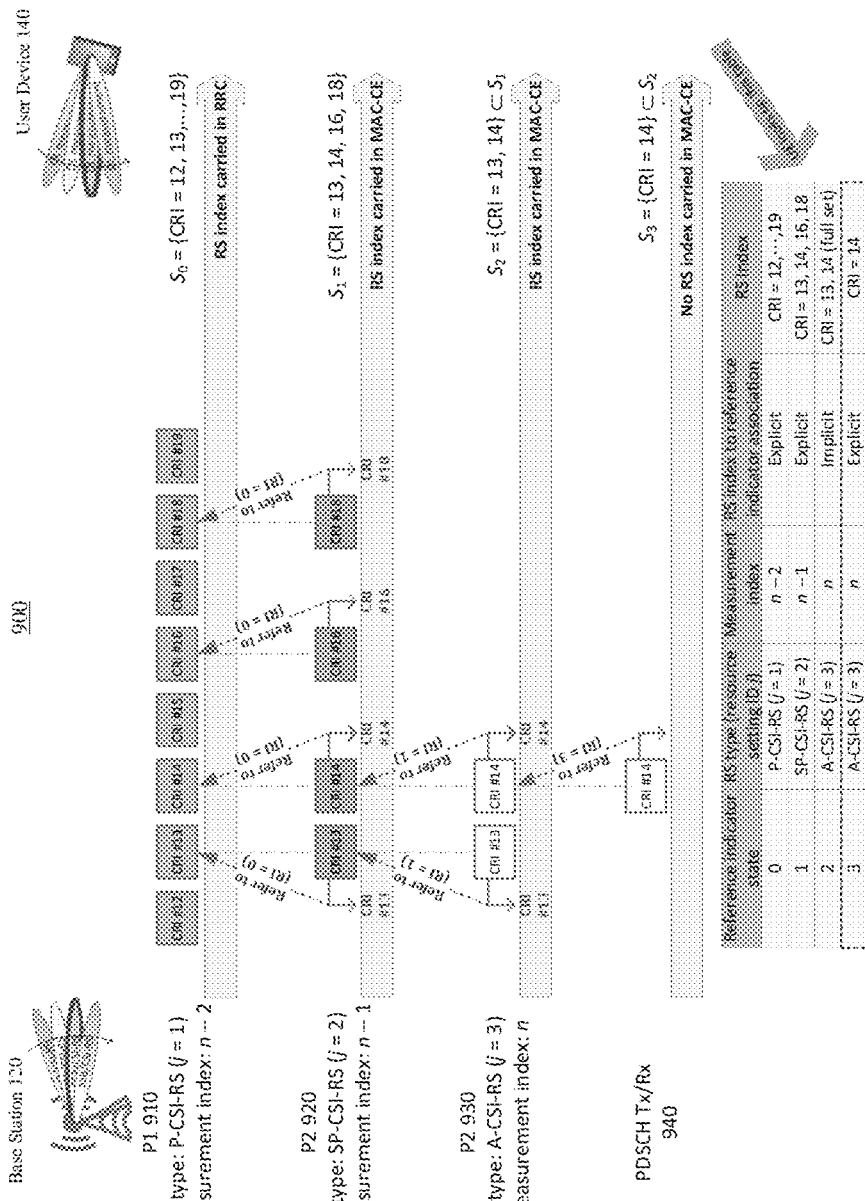
FIG. 9 illustrates an exemplary method for indicating a radio resource to a receiver in a wireless communication system, according to some embodiments of the present application.

FIG. 9 illustrates an exemplary method 900 for indicating a radio resource to a receiver in a wireless communication system, according to some embodiments of the present application. Base station 120 configures and updates a table in FIG. 9 with user device 140 through RRC signals and/or MAC-CEs before user device 140 applies the table for receiving indication of RS radio resources and/or transmit beams. When user device 140 receives a reference indicator state from base station 120, user device 140 can obtain an associated RS type, an associated measurement index, an associated RS index to reference indicator association, and/or one or more associated RS indexes in accordance with an entry of the table corresponding to the received reference indicator state.

In the table of FIG. 9, an RI can be used to indicate a reference indicator state through a MAC-CE or a DCI message. The RI includes four reference indicator states for indicating RS radio resources and/or transmit beams. A maximum number of reference indicator states is denoted by K, where K=4.

The table shown in FIG. 8 is at a stage of configuring a PDSCH Tx/Rx 940. The measurement indexes referring to previous a P1 procedure 910, a P2 procedure 920, and a P2 procedure 930 are denoted as n−2, n−1, and n, respectively, relative to measurement index "n" of P2 procedure 930, i.e., a current RS radio resource measurement since PDSCH Tx/Rx 940 shares the RS resource measurement of P2 procedure 930. Base station 120 can use one of the reference indicator state 0, 1, 2, and 3 to indicate transmit beams and/or RS resources, and base station 120 decides to select the state in a dashed line rectangle to indicate transmit beams and/or RS resources in PDSCH Tx/Rx 940.

As shown in the table of FIG. 9, a reference indicator state of the RI is associated with an RS type (i.e., a resource setting ID, j), a measurement index (i.e., n−i, $1 \leq i \leq M$), an RS index to reference indicator association, and one or more RS indexes. For example, the reference indicator state of "0" is associated with the RS type of "P-CSI-RS" (i.e., j=1), the measurement index of "n−2" (i.e., the previous $2^{rd}$ RS measurement), the RS index to reference indicator association of "explicit" (i.e., the association indicator=1), and the RS indexes of "CRI=12, . . . , 19" (i.e., indicated RS resources).

As shown in FIG. 9, base station 120 allocates eight periodic CSI-RSs associated with eight RS resources at CRIs #12 to #19 in P1 procedure 910. When base station 120 configures P1 procedure 910 with user device 140, base station 120 transmits eight RS indexes corresponding to the eight P-CSI-RSs and the RS resources through RRC signals to user device 140. Base station 120 then transmits P-CSI-RSs at the RS resources denoted as CRIs #12 to #19 to user device 140. The eight CRIs can also be denoted by $S_0=\{CRI: 12, 13, \ldots, 19\}$ as a set of BM-RS resources of P1 procedure 910. So is also an RS measurement set of P1 procedure 910.

On the other hand, user device 140 receives the eight RS indexes in the RRC signals from base station 120. Accordingly, user device 140 receives and measures the eight P-CSI-RSs on the corresponding RS resources indicated by the received RS indexes. User device 140 then sends a CSI/CRI report to base station 120. User device 140 may also store measurement results corresponding to the RS indexes, i.e., the CRIs, for determining receive beams $b_0$-$b_3$ and/or a radio resource in a current or subsequent beam management procedures.

As shown in FIG. 9, base station 120 also allocates four semi-persistent CSI-RSs (SP-CSI-RSs) associated with four RS resources at CRIs #13, #14, #16, and #18 in P2 procedure 920. When base station 120 configures P2 procedure 920 with user device 140, base station 120 transmits four RS indexes corresponding to the four SP-CSI-RSs and the RS resources through RRC signals to user device 140. Base station 120 then transmits the four periodic CSI-RSs on the RS resources denoted as CRIs #13, #14, #16, and #18 to user device 140. The four CRIs are also denoted by $S_1=\{CRI: 13, 14, 16, 18\}$ as a set of BM-RS resources of P2 procedure 920. $S_1$ is also an RS measurement set of P2 procedure 920.

On the other hand, user device 140 receives the four RS indexes in the RRC signals from base station 120. Accordingly, user device 140 receives and measures the four SP-CSI-RSs on the corresponding RS resources indicated by the received RS indexes. User device 140 then sends a CSI/CRI report to base station 120. User device 140 may also store measurement results corresponding to the RS indexes, i.e., the CRIs, for determining receive beams $b_0$-$b_3$ and/or a radio resource in a current or subsequent beam management procedures.

As shown in FIG. 9, base station 120 further allocates two aperiodic CSI-RSs (A-CSI-RSs) associated with two RS resources at CRIs #13 and #14 in P2 procedure 930. When base station 120 configures P2 procedure 930 with user device 140, base station 120 activates two RS indexes corresponding to the two A-CSI-RSs and the RS resources through a MAC-CE to user device 140. Base station 120 then transmits the two aperiodic CSI-RSs on the RS resources denoted as CRIs #13 and #14 to user device 140.

The two CRIs are also denoted by $S_2=\{CRI: 13, 14\}$ as a set of BM-RS resources of P2 procedure 930. $S_2$ is also an RS measurement set of P2 procedure 930. Since the RS measurement set $S_2$ of P2 procedure 930 is a subset of $S_1$ in P2 procedure 920. Base station 120 can indicate transmit beams and/or allocated CSI-RS resources at CRIs #13 and

14 by reference to the RS measurement set $S_1$ of the previous RS measurement in P2 procedure 920 using the RI and RS indexes.

As shown in the table of FIG. 9, base station 120 configures the RI=1 for reference to measurement resources in P2 procedure 920 and the RS measurement set $S_1$ thereof. As illustrated in the second entry of the table, base station 120 configures the reference indicator state of "1" (i.e., RI=1) to be associated with the RS type of "SP-CSI-RS" (i.e., j=2), the measurement index of "n–1" (i.e., the previous RS measurement relative to P2 procedure 930), the RS index to reference indicator association of "explicit" (i.e., the association indicator=1), and the RS indexes of "CRI=13 and 14 (full set)" (i.e., a full set of RS resources). Thus, base station 120 transmits the two RS indexes as either CRIs #13 and #14 or MIs #0 and #1 in the MAC-CE to user device 140, as illustrated in methods 400 and 500 in FIGS. 4 and 5.

On the other hand, after receiving the reference indicator state of "1" and obtaining the association indicator of "0," user device 140 obtains the two RS indexes, i.e., CRIs #13 and #14 or MIs #0 and #1, as CRIs #13 and #14 by reference to the RS measurement set $S_1$={CRI: 13, 14, 16, 18} in P2 procedure 940. Accordingly, user device 140 receives and measures the two aperiodic CSI-RSs on the corresponding RS resources indicated by the received RS indexes. User device 140 may then send a CSI/CRI report to base station 120 for transmit beam refinement in P2 procedure 930.

As shown in FIG. 9, base station 120 allocates an RS resource at CRIs #14 for PDSCH Tx/Rx 940. When base station 120 configures PDSCH Tx/Rx 940 with user device 140, base station 120 activates an RS index corresponding to the A-CSI-RS at CRI #14 in a MAC-CE to user device 140.

The CRI is also denoted by $S_3$={CRI: 14} as a set of BM-RS resources of PDSCH Tx/Rx 940. $S_3$ is also an RS measurement set of PDSCH Tx/Rx 940. Since the RS measurement set $S_3$ of PDSCH Tx/Rx 940 is a subset of $S_2$ in P2 procedure 930, base station 120 can indicate transmit beams and/or allocated CSI-RS resources at CRI #14 by reference to the RS measurement set $S_2$ in P2 procedure 930 using the RI and RS indexes. As shown in the table of FIG. 9, base station 120 configures and updates the entry of the reference indicator state of "3" to be associated with the RS type of "A-CSI-RS" (i.e., j=3), the measurement index of "n" (i.e., the current RS measurement), the RS index to reference indicator association of "explicit" (i.e., the association indicator=1), and the RS indexes of "CRI=14" (i.e., indicated RS resources). Thus, base station 120 decides to indicate RI=3, and transmits the RS indexes corresponding to CRI #14 in the MAC-CE to user device 140, as illustrated in methods 400 and 500 in FIGS. 4 and 5.

After receiving the reference indicator state of "3" and obtaining the association indicator of "1," user device 140 receives the RS index, CRI #14 or MI #1, as illustrated in methods 400 and 500 in FIGS. 4 and 5. Base station 120 then interprets the RS index as CRI #14 by reference to the current RS measurement set $S_3$={CRI: 13, 14}. User device 140 then receives PDSCH on the radio resources associated with CRI #14.

Figure 10:
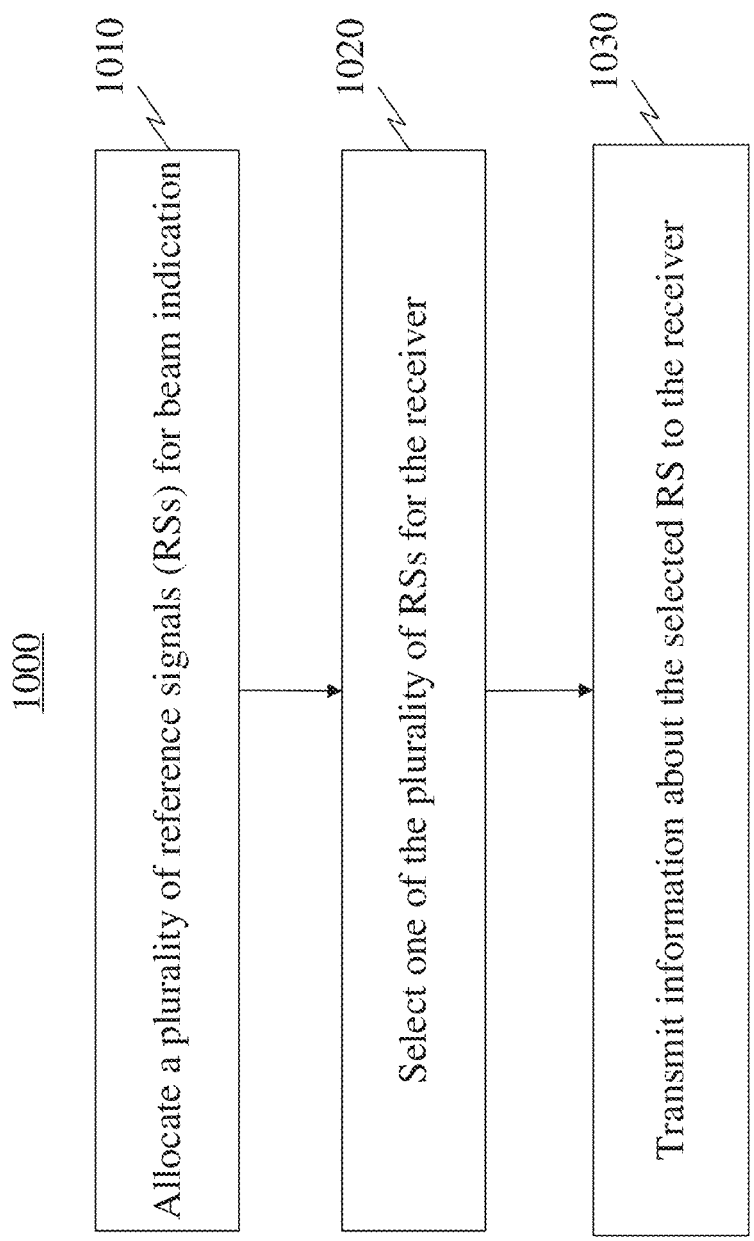
FIG. 10 is a flow chart of an exemplary method for indicating a radio resource to a receiver in a wireless communication system, according to some embodiments of the present application.

FIG. 10 is a flow chart of an exemplary method 1000 for indicating a radio resource to a receiver in a wireless communication system, according to some embodiments of the present application. Method 1000 may be practiced by base station 120. Method 1000 includes allocating a plurality of reference signals (RSs) for beam indication (step 1010), selecting one of the plurality of RSs for the receiver (step 1020), and transmitting information about the selected RS to the receiver (step 1030), wherein the information includes a reference indication (RI) that indicates the radio resource of the selected RS.

Step 1010 includes allocating a plurality of reference signals (RSs) for beam indication. For example, as shown in FIG. 1, base station 120 allocates a plurality of CSI-RSs or DM-RSs for beam indication of four transmit beams $B_0$-$B_3$ to user device 140. In DL transmissions, method 1000 is practiced by base station 120, and user device 140 is a receiver for the DL transmissions from base station 120. As shown in FIG. 1, base station 120 allocates and transmits, for example, CSI-RS or DM-RS as reference signals on transmit beams $B_0$-$B_3$. The RS resources that base station 120 allocates for transmitting the CSI-RSs or DM-RSs are considered as associated with the transmit beams $B_0$-$B_3$.

Step 1020 includes selecting one of the plurality of RSs for the receiver. For example, as shown in FIG. 3 and method 300, base station 120 received the RSRPs of the UE-specific CSI-RSs on the allocated CSI-RS resources. In accordance with the received RSRPs, base station 120 can select one or more of UE-specific CSI-RSs for user device 140. Accordingly, base station 120 allocates CSI-RS resources corresponding to the selected CSI-RS for transmit beams $B_0$-$B_3$ to user device 140.

Step 1030 includes transmitting information about the selected RS to the receiver, wherein the information includes a reference indication (RI) that indicates the radio resource of the selected RS in step 1020. For example, as shown in FIG. 5, base station 120 allocates the four aperiodic CSI-RSs by reference to the previous measurement set $S_0$ with the MRI set as "0," that indicates the last RS measurement performed between base station 120 and user device 140. When base station 120 intends to activate the four aperiodic CSI-RSs at CRIs #12, #13, #15 and #17, base station 120 transmits four MIs of "001," "010," "100," and "110" and an MRI of "0" in the MAC-CE to user device 140. User device 140 interprets the four MIs by reference to the last RS measurement in accordance with the MRI of "0." By reference to the last RS measurement set $S_0$, user device 140 interprets the four MIs of "001," "010," "100," and "110" as MIs #1, #2, #4, and #6 in $S_0$={11, 12, 13, 14, 15, 16, 17, 18}, i.e., CRIs #12, #13, #15 and #17. These RS radio resources indicated by the MRI and/or MIs are radio resources of the selected RSs.

In some embodiments, the selected RS in step 1020 is a first RS and the RI indicates a radio resource of a second RS, wherein the second RS is quasi-co-located with the first RS, a parameter of the first RS being referred to for indicating the second RS. For example, as shown in FIG. 1, when BPLs 100, 111, 112, and 122 are formed between base station 120 and user device 140, base station 120 transmits a DM-RS port that is quasi-co-located with RS resources of the selected CSI-RS, such as CRIs #12, #13, #15 and #17 indicated by the MRI and/or MIs in P2 procedure 520 in method 500 of FIG. 5. User device 140 can receive the DM-RS resource in accordance with that of the quasi-co-located, selected CSI-RSs: CRIs #12, #13, #15 and #17, which is indicated through the MRI and/or MIs. Accordingly, the MRI and/or MIs also indicate the radio resource of the DM-RS port. The radio resources, spatial parameters, Doppler/delay parameters, and/or average gain of the selected CSI-RSs can be referred to for indicating the DM-RS.

In some embodiments, step 1010 includes allocating the plurality of RSs for beam indication by allocating a plurality of RS measurement resources corresponding to a plurality of transmit beams. The plurality of RS measurement resources include radio resources of an SSB, a CSI-RS, or an SRS. For example, as shown in FIG. 7, base station 120 allocates eight SSBs at time indexes 22 through 29, i.e., $S_0=\{$ TI: 22, ..., 27, 28, 29$\}$. The eight SSBs are RS measurement resources associated with eight transmit beams. As another example shown in FIG. 7, base station 120 also allocated four P-CSI-RSs associated with CRIs #13, #14, #16, and #18, i.e., $S_1=\{$CRI: 13, 14, 16, 18$\}$. The four CRIs are RSs and RS measurement resources associated with four transmit beams. Alternatively, base station 120 can also allocate two SRSs associated with SRIs #31 and #32. The two SRIs are RSs and RS measurement resources associated with two transmit beams.

In some embodiments, step 1020 includes selecting one of the plurality of RSs for the receiver in accordance with a plurality of RS measurement results received from the receiver. For example, as shown in FIG. 3, base station 120 receives a CSI/CRI report to from user device 140 (step 330). Base station 120 then refers to the measurements in the CSI/CRI report and determines one or more of transmit beams $B_0$-$B_3$ for transmitting beamformed signals to user device 140. For example, base station 120 determine beam $B_1$ and $B_2$ for transmitting aperiodic CSI-RS to user device 140 (step 350).

In some embodiments, the RI in step 1030 can indicate one of a plurality of RS measurements as a reference measurement for indication of the radio resource of the selected RS. For example, as shown in FIG. 5, base station 120 allocates four aperiodic CSI-RSs on RS resources at CRIs #12, #13, #15 and #17 for P2 procedure 520. Base station 120 activates the four aperiodic CSI-RSs at CRIs #12, #13, #15 and #17 by transmitting four RS indexes in a MAC-CE to user device 140. Since the RS measurement set of P2 procedure 520 is a subset of that of P1 procedure 510, i.e., $S_1=\{12, 13, 15, 17\} \subset S_0=\{11, 12, \ldots, 18\}$, base station 120 can allocate the four aperiodic CSI-RSs by reference to the previous RS measurement set $S_0$ using the MRI.

Moreover, for example, as shown in FIG. 5, the one-bit MRI of "0" (i.e., MRI=0) indicates that the last RS measurement is referred to, and the one-bit MRI of "1" (i.e., MRI=1) indicates that the last RRC-configured RS measurement is referred to.

In some embodiments, the RI in step 1030 is transmitted to the receiver in a radio resource control (RRC) message, a medium access control (MAC) control element (CE), a downlink control information (DCI) message, or any combination thereof. For example, as shown in FIG. 5, after base station 120 allocates eight periodic CSI-RSs (P-CSI-RSs) associated with eight RS resources at CRIs #11 to #18 in a P1 procedure 510, base station 120 configures a P2 procedure and allocates four periodic CSI-RSs at CRIs #12, #13, #15, and 17 through RRC signals to user device 140. Since the RS measurement set of the P2 procedure is a subset of that of P1 procedure 510, i.e., $S=\{12, 13, 15, 17\} \subset S_0=\{11, 12, \ldots, 18\}$, base station 120 can allocate the four periodic CSI-RSs by reference to the previous RS measurement set $S_0$ using an MRI. Base station 120 transmits the MRI and other configuration information in the RRC signal to user device 140. When base station 120 sets the MRI to "0," base station 120 indicates that the last measurement is the measurement reference for the P2 procedure.

As another example, as shown in FIG. 7, base station 120 allocates two semi-persistent CSI-RSs (SP-CSI-RSs) associated with two RS resources at CRIs #13 and #14 in a P2 procedure 730. When base station 120 configures P2 procedure 730 with user device 140, base station 120 activates two RS indexes corresponding to the two SP-CSI-RSs and the RS resources through a MAC-CE to user device 140. Since the RS measurement set $S_2$ of P2 procedure 730 is a subset of $S_1$ in P1 procedure 720, base station 120 can indicate transmit beams, allocated CSI-RSs, and/or RS radio resources at CRIs #13 and #14 by reference to the RS measurement set $S_1$ of the previous RS measurement in P1 procedure 720 using the RI and RS indexes.

As another example, in P2 procedure 530 as shown in FIG. 5, base station 120 allocates and transmits the two aperiodic CSI-RSs with CRIs #12 and #13 and the MRI via a DCI to user device 140. The MRI is set as "0" that indicates the reference to the previous RS measurement in P2 510 measurement. Base station 120 can transmit two MIs of "00" and "01" and an MRI of "0" in a DCI to refer to the first and second RSs in the RS measurement set $S_1$ of the last measurement.

Alternatively, after P2 procedure 530 in FIG. 5, base station 120 can allocate and transmit, for example, an aperiodic CSI-RS with CRI #13 and an MRI via another DCI message to user device 140. The MRI is set as "0" that indicates the reference to the previous RS measurement in P2 procedure 530. In other words, the MRI transmitted in the DCI indicates that the previous RS measurement, i.e., an RS measurement on the aperiodic CSI-RSs associated with #12 and #13, is the reference for such an aperiodic RS measurement.

In some embodiments, as shown in FIG. 5, base station 120 can allocate the eight periodic CSI-RSs associated with CRIs #11 to #18 and a first MRI through RRC signals to user device 140 in P1 procedure 510. Base station 120 also allocates and transmits the four aperiodic CSI-RSs with CRIs #12, #13, #15 and #17 with a second MRI via a medium access control element (MAC-CE) to user device 140 in the P2 procedure 520. Base station 120 further allocates the two aperiodic CSI-RSs associated with CRIs #12 and #13 with a third MRI through a DCI to user device 140. Base station 120 can determine one of the RRC message, the MAC-CE, and the DCI for transmitting the MRIs and can transmit multiple MRIs for indicating RS radio resources and/or beam indication. Base station 120 therefore can transmit the MRIs to user device 140 in an RRC message, a MAC-CE, a DCI message, or any combination thereof.

In some embodiments, the RI in step 1030 is associated with a reference signal (RS) index for indicating the radio resource of the selected RS, wherein the RS index includes: an SSBRI, a CRI, or an SRI. For example, as shown in FIG. 6, when the MRI includes a reference indicator state "0," the MRI is associated with SSB resource indexes 0 through 15 (i.e., TI=0-15) for indicating the radio resources of the selected SSBs. As another example, as shown in FIG. 6, when the MRI includes a reference indicator state "4," the MRI is associated with CRI=9, 19, and 20 for indicating the radio resources of the selected CSI-RSs. In addition, an additional reference indicator state of "10" can be added to extend the table in FIG. 6, and a four-bit MRI of "10" can be associated with, for example, SRI=30 and 31 for indicating the radio resources of the selected SRSs.

In some embodiments, the RI in step 1030 is associated with a resource setting identity (ID), wherein the resource setting ID indicates a reference signal (RS) type including: synchronization signal block, periodic channel status information reference signal, semi-persistent channel status information reference signal, aperiodic channel status information reference signal, or sounding reference signal.

For example, as shown in FIG. 6, when the MRI includes a reference indicator state "0," the MRI is associated with a resource setting ID: j=0. The resource setting ID: j=0 indicates an RS type of SSB. When the MRI includes a reference indicator state "2," the MRI is associated with a resource setting ID: j=1. The resource setting ID: j=1 indicates an RS type of P-CSI-RS. When the MRI includes a reference indicator state "3," the MRI is associated with a resource setting ID: j=2. The resource setting ID: j=2 indicates an RS type of SP-CSI-RS. When the MRI includes a reference indicator state "4," the MRI is associated with a resource setting ID: j=3. The resource setting ID: j=3 indicates an RS type of A-CSI-RS.

In some embodiments, the RI in step 1030 is associated with a measurement index. The measurement index indicates one of a plurality of previous RS measurements as a reference measurement for indicating the radio resource of the selected RS. For example, as shown in FIG. 6, when the MRI includes a reference indicator state "0," the MRI is associated with a measurement index: n−22. The measurement index of n−22 indicates a previous $22^{nd}$ RS measurement as a reference measurement for indicating the radio resource of the selected RS. As another example shown in FIG. 7, the MRI of a reference indicator state of "3" is associated with a measurement index: n−1. The measurement index of n−1 indicates a previous $1^{st}$ RS measurement as a reference measurement for indicating the radio resource of the selected RS, i.e., CRI #13 and #14 as shown in FIG. 7.

In some embodiments, the RI in step 1030 is associated with an RS index for indicating a reference radio resource of the selected RS and with a reference type, wherein the reference type includes: an implicit association between the RS index and a reference measurement, or an explicit association between the RS index and the reference measurement.

For example, as shown in FIG. 6, when the MRI includes a reference indicator state "0," the MRI is associated with SSB resource indexes 0 through 15 (i.e., TI=0-15) for indicating the radio resource of the selected SSB and an implicit reference type. With the implicit reference type, base station 120 does not need to transmit anything for indicating SSBRIs in the previous $22^{nd}$ RS measurement because all SSBRIs are used in the current measurements or transmissions.

As another example shown in FIG. 7, the MRI of a reference indicator state of "3" is associated with the SP-CSI-RS at CRI #13 and #14 and an implicit reference type. The implicit reference type indicates that a full set of RS indexes of the referenced SP-CSI-RS measurement are used in the current measurement. As shown in FIG. 7, the referenced SP-CSI-RS measurement includes CRI #13 and 14. Accordingly, base station 120 does not need to transmit anything to indicate CRI #13 and 14. User device 140 can perform measurements on radio resources at CRI #13 and #14 in accordance with the table in FIG. 7.

As another example shown in FIG. 7, the MRI of a reference indicator state of "3" is also associated with the SSB at TI #27 and an explicit reference type. The explicit reference type indicates that a subset of RS indexes of the referenced SSB measurement is used in the current measurement. As shown in FIG. 7, the referenced SSB measurement includes TIs=25, 26 and 27, i.e., $S_0$. Base station 120 transmits through a MAC-CE to user device 140 an RS index to indicate that $S_{3,1}$ {TI=27}, a subset of $S_0$, is used. User device 140 then performs measurements on TI=27 in accordance with the transmitted RS index from base station 120.

In some embodiments, base station 120 can transmit through an RRC message to user device 140 the RS index to indicate that $S_{3,1}$ {TI=27}, a subset of $S_0$, is used. In some embodiments, base station 120 can also transmit through a MAC-CE another RS index and another explicit reference type to user device 140 to indicate that TI=25 when the MRI is at the reference indicator state 3.

In some embodiments, when the reference type includes the explicit association, the RS index includes a subset of RS indexes of the reference measurement. The method 1000 also includes transmitting one or more RS indexes in a radio resource control (RRC) message or a medium access control (MAC) control element (CE) to the receiver. For example, as shown in FIG. 4, base station 120 allocates and transmits eight periodic CSI-RSs associated with eight resource indicators, CRIs #11 to #18, through RRC signals to user device 140 for P1 procedure 410. Base station 120 then allocates four aperiodic CSI-RSs with CRIs #12, #13, #15 and #17 via a medium access control element (MAC-CE) to user device 140.

When base station 120 allocates the four aperiodic CSI-RSs with CRIs #12, #13, #15 and #17, base station 120 transmits four MIs of "001," "010," "100," and "110" in an RRC signal, a MAC-CE or a DCI to user device 140. By reference to the previous RS measurement set $S_0$, user device 140 interprets the four MIs of "001," "010," "100," and "110" as MIs #1, #2, #4, and #6 in $S_0$, i.e., CRIs #12, #13, #15 and #17. The MIs can be the RS indexes. Because the CSI-RSs in the measurements are a subset of the previous RS measurement set $S_0$, base station 120 indicates radio resources associated with CRIs #12, #13, #15 and #17 by reference to the previous RS measurement and the RS indexes (i.e., the MIs) therein.

In some embodiments, the RI in step 1030 is associated with a number of reference measurements, wherein the RI is further associated with at least one of: a number of measurement indexes equal to the number of reference measurements, a number of reference types equal to the number of reference measurements, a number of resource setting identities (IDs) equal to the number of reference measurements, a number of reference signal (RS) indexes for indication of radio resources of RSs equal to the number of reference measurements. Each measurement index indicates one of a plurality of previous RS measurements as a reference measurement for indication of the radio resource of the selected RS. Each RS index includes an SSBRI, a CRI, or an SRI. Each resource setting ID indicates an RS type including SSB, P-CSI-RS, SP-CSI-RS, A-CSI-RS, or SRS. Each reference type includes an implicit or explicit association between an RS index and a reference measurement.

For example, as shown in FIG. 6, the MRI of a reference indicator state of "2" is associated with two reference measurements, i.e., the previous $16^{th}$ and $5^{th}$ measurements. The MRI is associated with two measurement indexes: n−16 and n−5. The measurement index=n−16 indicates the previous $16^{th}$ RS measurement as the reference measurement for indication of the radio resource of the selected RS. The measurement index=n−5 indicates the previous $5^{th}$ RS measurement as a reference measurement for indication of transmit beam. The MRI is also associated with two reference types, i.e., an explicit association with the previous $16^{th}$ measurement and an implicit association with the $5^{th}$ measurement.

The MRI is also associated with two resource setting IDs: j=1 and 2. The resource setting ID: j=1 indicates P-CSI-RS and the resource setting ID: j=2 indicates SP-CSI-RS. The MRI is also associated with two RS indexes, i.e., $CRI_1$=3 and 4 and $CRI_2$=22 and 23, for indication of the radio resource of the selected RS. The $CRI_1$ indicates CRI #3 and CRI #4 to be measured, and the $CRI_2$ indicate CRI #22 and #23 to be measured. As noted above, in some embodiments, an RS index for indication of the radio resource of the selected RS can also be one of SSB TI, CRI, or SRI.

Figure 11:
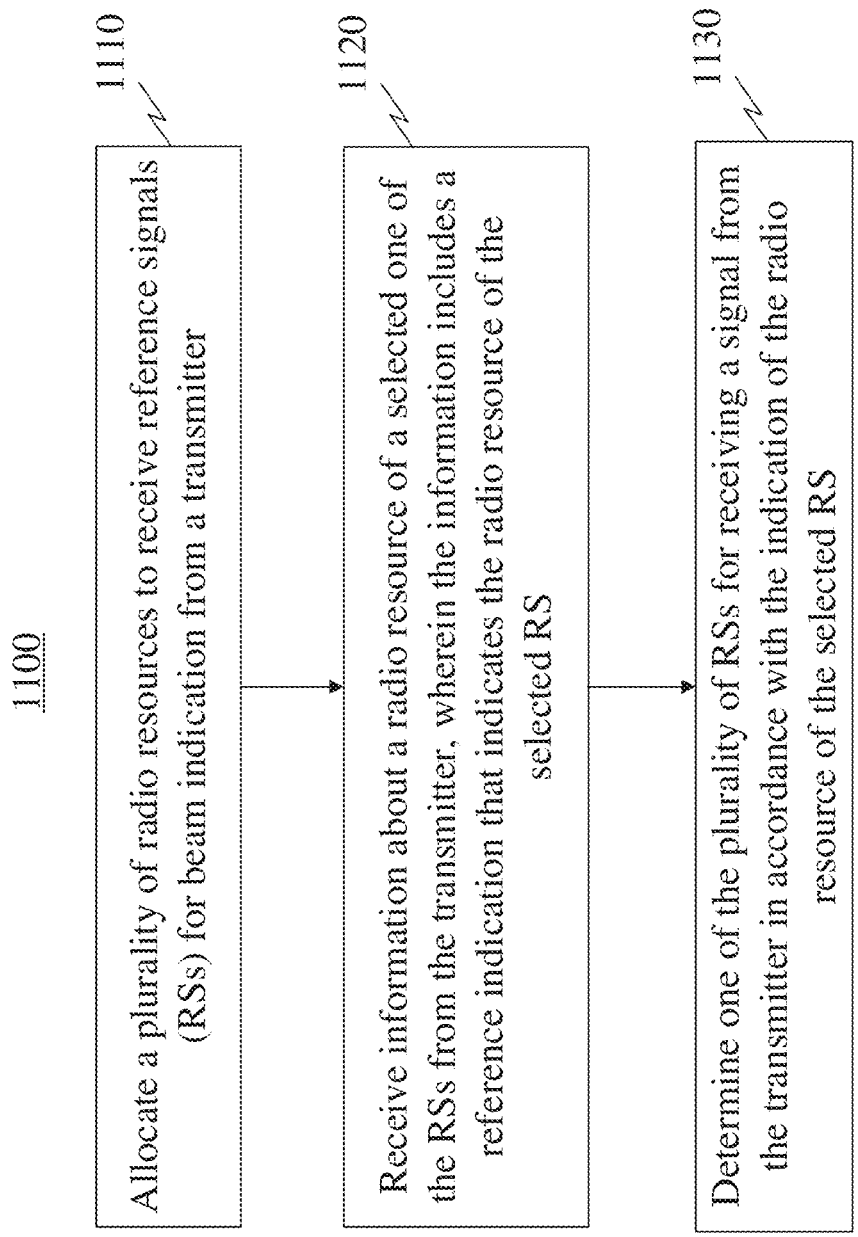
FIG. 11 is a flow chart of an exemplary method for receiving indication of a radio resource for a receiver in a wireless communication system, according to some embodiments of the present application.

FIG. 11 is a flow chart of an exemplary method 1100 for receiving indication of a radio resource for a receiver in a wireless communication system, according to some embodiments of the present application. Method 1100 may be practiced by user device 140. Method 1100 includes allocating a plurality of radio resources to receive reference signals (RSs) for beam indication from a transmitter (step 1110), receiving information about the radio resource of a selected one of the RSs from the transmitter (step 1120), wherein the information includes a reference indication (RI) that indicates the radio resource of the selected RS, and determining one of the plurality of RSs for receiving a signal from the transmitter in accordance with the indication of the radio resource of the selected RS (step 1130).

Step 1110 includes allocating a plurality of radio resources to receive RSs for beam indication from a transmitter. For example, as shown in FIG. 1 or 2, user device 140 allocates a plurality of CSI-RS or DM-RSs corresponding to beams $b_0$-$b_3$ for downlink (DL) transmissions from base station 120. In DL transmissions, method 1100 is practiced by user device 140, and base station 120 is a transmitter for the DL transmissions to user device 140. As shown in FIG. 1, user device 140 allocates and receives, for example, CSI-RS or DM-RS on the configured receive beams $b_0$-$b_3$. The reference signals or radio resources that base station 120 allocated for transmitting the RSs are considered as associated with the transmit beams $B_0$-$B_3$, and can also be referred to as the transmit beams $B_0$-$B_3$. To receive beamformed signals from the transmit beams $B_0$-$B_3$, user device 140 allocates receive beams $b_0$-$b_3$ and/or radio resources to receive DL signals.

Step 1120 includes receiving information about the radio resource of a selected one of the RSs from the transmitter, wherein the information includes a reference indication (RI) that indicates the radio resource of the selected RS. For example, as shown in FIG. 5, base station 120 allocates the four aperiodic CSI-RSs with CRIs #12, #13, #15 and #17, and transmits four MIs of "001," "010," "100," and "110" in the MAC-CE or a DCI and an MRI of "0" to user device 140. User device 140 receives the four MIs by reference to the last RS measurement in accordance with the MRI of "0." The MRI and/or MIs can indicate the radio resources of the selected CSI-RSs at CRIs #12, #13, #15 and #17.

Step 1130 includes determining one of the plurality of RSs for receiving a signal from the transmitter in accordance with the indication of the radio resource of the selected RS. For example, as shown in FIG. 1 or 2, through the association between CRIs, beam identities (i.e., transmit beams $B_0$-$B_3$), MIs, and/or an MRI, user device 140 can determine an RS and its radio resource in accordance with the indication of the radio resource of the selected CSI-RS associated with the CRI. When user device 140 receives an MI of 2, user device 140 can determine the third receive beam, i.e., receive beam $b_2$, for receiving beamformed signals from base station 120. A corresponding CSI-RS can be, for example, CSI-RS at CRI #2. Accordingly, user device 140 receives radio resources at CRI #2 and other signals or data transmitted on receive beam $b_2$.

In some embodiments, the selected RS in step 1120 is a first RS and the RI indicates a radio resource of a second RS, wherein the second RS is quasi-co-located with the first RS, a parameter of the first RS being referred to for indicating the second RS. For example, as shown in FIG. 1, when BPLs 100, 111, 112, and 122 are formed between base station 120 and user device 140, base station 120 transmits a DM-RS port that is quasi-co-located with RS resources of the selected CSI-RS. User device 140 can receive the DM-RS resource in accordance with that of the quasi-co-located, selected CSI-RS, which is indicated through the MRI. Accordingly, the MRI also indicates the radio resource of the DM-RS port. The radio resources, spatial parameters, Doppler/delay parameters, and/or average gain of the selected CSI-RS can be referred to for indicating the DM-RS.

In some embodiments, step 1110 includes allocating a plurality of radio resources to receive RSs for beam indication from a transmitter by allocating a plurality of RS measurement resources corresponding to a plurality of receive beams. The plurality of RS measurement resources include radio resources of an SSB, a CSI-RS, or an SRS. For example, as shown in FIG. 7, user device 140 receives an MRI associated with eight SSBs at time indexes 22 through 29, i.e., $S_0$={TI: 22, . . . , 27, 28, 29} from base station 120. The eight SSBs are RS measurement resources associated with eight transmit beams. In correspondence with the eight transmit beams, user device 140 allocates the receive beams and/or radio resources to receive corresponding eight transmit beams.

As another example shown in FIG. 7, user device 140 receives another MRI associated with four P-CSI-RSs associated with CRIs #13, #14, #16, and #18, i.e., $S_1$={CRI: 13, 14, 16, 18}. The four CRIs are RSs and RS measurement resources associated with four transmit beams. In correspondence with the four transmit beams, user device 140 allocates the four CRIs as RS measurement resources corresponding to four receive beams. Alternatively, base station 120 can also allocate two SRSs associated with SRIs #31 and #32. The two SRIs are RSs and RS measurement resources associated with two transmit beams. User device 140 also allocates radio resources at SRIs #31 and #32 as RS measurement resources corresponding to two receive beams.

In some embodiments, the RI in step 1120 is received from the transmitter in: a radio resource control (RRC) message, a medium access control (MAC) control element (CE), a downlink control information (DCI) message, or any combination thereof.

For example, after base station 120 allocates eight periodic CSI-RSs (P-CSI-RSs) associated with eight RS resources at CRIs #11 to #18 in a P1 procedure 510, base station 120 configures a P2 procedure and allocates four periodic CSI-RSs at CRIs #12, #13, #15, and 17 through RRC signals to user device 140. Since the RS measurement set of the P2 procedure is a subset of that of P1 procedure 510, i.e., S={12, 13, 15, 17} ⊂ $S_0$={11, 12, . . . , 18}, base station 120 can allocate the four periodic CSI-RSs by reference to the previous RS measurement set $S_0$ using an MRI. Base station 120 transmits the MRI and other configuration information in the RRC signal to user device 140. User device 140 receives the MRI in the RRC signal accordingly. When base station 120 sets the MRI to "0," user device 140 interprets that the last measurement is a measurement reference for the P2 procedure.

As another example, as shown in FIG. 7, base station 120 allocates two semi-persistent CSI-RSs (SP-CSI-RSs) associated with two RS resources at CRIs #13 and #14 in a P2 procedure 730. When base station 120 configures P2 procedure 730 with user device 140, base station 120 activates two RS indexes corresponding to the two SP-CSI-RSs and the RS resources through a MAC-CE to user device 140.

User device 140 receives the RS indexes in the MAC-CE accordingly. Since the RS measurement set $S_2$ of P2 procedure 730 is a subset of $S_1$ in P1 procedure 720, base station 120 can indicate transmit beams and/or allocated CSI-RS resources at CRIs #13 and #14 by reference to the RS measurement set $S_1$ of the previous RS measurement in P1 procedure 720 using the RI and RS indexes.

As another example, in P2 procedure 530 shown in FIG. 5, base station 120 allocates and transmits the two aperiodic CSI-RSs with CRIs #12 and #13 and the MRI via a DCI to user device 140. The MRI is set as "0" that indicates the reference to the previous RS measurement that is the first P2 of measurement. User device 140 receives the MRI in the MAC-CE that indicates that the previous RS measurement, i.e., RS measurement on the four aperiodic CSI-RSs associated with #12, #13, #15 and #17, is the reference for P2 procedure 530.

Alternatively, after P2 procedure 530 in FIG. 5, base station 120 can allocate and transmit, for example, an aperiodic CSI-RS with CRI #13 and an MRI via another DCI to user device 140. The MRI is set as "0" that indicates the reference to the previous RS measurement that is P2 procedure 520. User device 140 can receive the CRIs and the MRI in the DCI from base station 120. The MRI received by user device 140 in the DCI indicates that the previous RS measurement, i.e., an RS measurement on the aperiodic CSI-RSs associated with #12 and #13, is the reference for such an aperiodic RS measurement.

In some embodiments, as shown in FIG. 5 and illustrated above, base station 120 can determine one of the RRC message, the MAC-CE, and the DCI for transmitting the MRIs and can transmit multiple MRIs for indication of the radio resource of the selected RS. Base station 120 therefore can transmit the MRIs to user device 140 in an RRC message, a MAC-CE, a DCI, or any combination thereof. Accordingly, user device 140 receives the MRIs from base station 120 in the RRC message, the MAC-CE, the DCI, or any combination thereof.

In some embodiments, step 1130 includes determining one of the plurality of RSs for receiving a signal from the transmitter in accordance with the RI and a plurality of RS measurement results. For example, as shown in FIG. 3, user device 140 receives beam indication information from base station 120 by DCI (step 340). The beam indication information can include an MRI associated with transmit beams $B_1$ and $B_2$.

User device 140 receives and measures each of transmit beams $B_0$-$B_3$ by receive beams $b_0$-$b_3$. Accordingly, user device 140 can determine one or more of RSs associated with receive beams $b_0$-$b_3$ for receiving each of transmit beams $B_0$-$B_3$ in accordance with a plurality of RS measurement results. For example, user device 140 may determine receive beams for BPLs 100, 111, 112, and 122 in accordance with the plurality of reference signal measurement results. Moreover, because user device 140 is aware of the association between CRIs, beam identities, and the MRI, user device 140 can determine receive beams $b_2$ for receiving beamformed signals transmitted by transmit beams $B_1$ and $B_2$. In other words, user device 140 determines receive beam $b_2$ for receiving a signal from base station 120 in accordance with the MRI and a plurality of reference signal measurement results.

In some embodiments, the RI in step 1120 can indicate one of a plurality of RS measurements as a reference measurement for indication of the radio resource of the selected RS. For example, as shown in FIG. 5, base station 120 allocates four aperiodic CSI-RSs on RS resources at CRIs #12, #13, #15 and #17 for P2 procedure 520. Base station 120 activates the four aperiodic CSI-RSs at CRIs #12, #13, #15 and #17 by transmitting four RS indexes in a MAC-CE to user device 140. Since the RS measurement set of P2 procedure 520 is a subset of that of P1 procedure 510, i.e., $S_1$={12, 13, 15, 17} ⊂ $S_0$={11, 12, ..., 18}, base station 120 can allocate the four aperiodic CSI-RSs by reference to the previous RS measurement set $S_0$ using the MRI.

Moreover, for example, as shown in FIG. 5, the one-bit MRI of "0" (i.e., MRI=0) indicates that the last RS measurement is referred to, and the one-bit MRI of "1" (i.e., MRI=1) indicates that the last RRC-configured RS measurement is referred to.

In some embodiments, the RI in step 1120 is associated with an RS index for indication of the radio resource of the selected RS, wherein the RS index includes: an SSBRI, a CRI, or an SRI.

For example, as shown in FIG. 6, when the MRI includes a reference indicator state of "0," the MRI is associated with SSB time indexes 0 through 15, i.e., SSBRI #0-#15 for indication of the radio resource of the selected RS. As another example shown in FIG. 7, for the reference indicator state of "3," user device 140 receives a configuration of P2 procedure 740 that includes two A-CSI-RSs associated with CRIs #13 and #14 and one SSB associated with TI #27. The MRI of a reference indicator state of "3" is associated with SSB TI=27. Thus, the MRI with the reference indicator state of "3" provides a reference to the RS index (i.e., SSB TI=27) for indication of the radio resource of the selected RS. The referenced RS measurement is P1 procedure 710 that includes measurements in accordance with the SSB TI=22, 23, ..., 29.

As another example shown in FIG. 6, when the MRI includes a reference indicator state of "3," the MRI is associated with CRI #4 and #6 for transmit beam indication. As another example shown in FIG. 7, for the reference indicator state=2, user device 140 receives a configuration of the P2 procedure that includes two SP-CSI-RSs associated with CRIs #13 and #14. The MRI of a reference indicator state of "3" is associated with CRIs #13 and #14. Thus, the MRI with the reference indicator state 3 provides a reference to the RS index (i.e., CRI #13 or #14) for indication of the radio resource of the selected RS. The referenced one of RS measurements is the P2 procedure that includes measurements in accordance with the CRI #13 and #14.

In addition, an additional reference indicator state of "10" can be added to extend the table in FIG. 6, and a four-bit MRI of "10" can be associated with, for example, SRI=30 and 31 for indicating the radio resources of the selected SRSs.

In some embodiments, the RI in step 1120 is associated with a resource setting identity (ID), wherein the resource setting ID indicates a reference signal (RS) type including: synchronization signal block, periodic channel status information reference signal, semi-persistent channel status information reference signal, aperiodic channel status information reference signal, or sounding reference signal.

For example, as shown in FIG. 6, when the MRI includes a reference indicator state of "0," the MRI is associated with a resource setting ID: j=0. The resource setting ID: j=0 indicates an RS type of SSB. When the MRI includes a reference indicator state of "2," the MRI is associated with a resource setting ID: j=1. The resource setting ID: j=1 indicates an RS type of P-CSI-RS. When the MRI includes a reference indicator state of "3," the MRI is associated with a resource setting ID: j=2. The resource setting ID: j=2 indicates an RS type of SP-CSI-RS. When the MRI includes a reference indicator state of "4," the MRI is associated with a resource setting ID: j=3. The resource setting ID: j=3 indicates an RS type of A-CSI-RS.

In some embodiments, the RI in step 1120 is associated with a measurement index. The measurement index indicates one of a plurality of previous RS measurements as a reference measurement for indication of the radio resource of the selected RS. For example, as shown in FIG. 6, when the MRI includes a reference indicator state of "0," the MRI is associated with a measurement index: n−22. The measurement index of n−22 indicates a previous $22^{nd}$ RS measurement as a reference measurement for indication of the radio resource of the selected RS. As another example shown in FIG. 7, the MRI of a reference indicator station 3 is associated with a measurement index: n−1. The measurement index of n−1 indicates a previous $1^{st}$ RS measurement as a reference measurement for indication of the radio resource of the selected RS, i.e., CRI #13 and #14 as shown in FIG. 7.

In some embodiments, the RI in step 1120 is associated with an RS index for indication of the radio resource of the selected RS and with a reference type, wherein the reference type includes: an implicit association between the RS index and a reference measurement, or an explicit association between the RS index and the reference measurement.

For example, as shown in FIG. 6, when the MRI includes a reference indicator state of "0," the MRI is associated with SSB time indexes 0 through 15 (i.e., TI=0-15) for indication of the radio resource of the selected RS and an implicit reference type. With the implicit reference type, user device 140 does not need to receive from base station 120 anything for indicating SSB TIs in the previous $22^{nd}$ RS measurement because all SSB TIs are used in the current measurements or transmissions.

As another example shown in FIG. 7, the MRI of a reference indicator state of "3" is associated with the SP-CSI-RS at CRI #13 and #14 and an implicit reference type. The implicit reference type indicates that a full set of RS indexes of the referenced SP-CSI-RS measurement are used in the current measurement. As shown in FIG. 7, the referenced SP-CSI-RS measurement includes CRI #13 and 14. Accordingly, user device 140 does not need to receive from base station 120 anything for indicating CRI #13 and 14. User device 140 can perform measurements on CRI #13 and #14 in accordance with the table in FIG. 7.

As another example shown in FIG. 7, the MRI of a reference indicator state of "3" is also associated with SSB at TI=27 and an explicit reference type. The explicit reference type indicates that a subset of RS indexes of the referenced SSB measurement is used in the current measurement. As shown in FIG. 7, the referenced SSB measurement includes TIs=25, 26 and 27, i.e., $S_0$. User device 140 receives from base station 120 through a MAC-CE an RS index to indicate that $S_{3,1}$ {TI=27}, a subset of $S_0$, is used. User device 140 then performs measurements on TI=27 in accordance with the transmitted RS index from base station 120. In some embodiments, user device 140 can receive from base station 120 through an RRC message the RS index to indicate that $S_{3,1}$ {TI=27}, a subset of $S_0$, is used. In some embodiments, user device 140 can also receive from base station 120 through another MAC-CE another RS index and another explicit reference type to indicate that TI=25 when the MRI is at the reference indicator state 3.

In some embodiments, the RI in step 1120 is associated with a number of reference measurements, wherein the RI is further associated with at least one of: a number of measurement indexes equal to the number of reference measurements, a number of reference types equal to the number of reference measurements, a number of resource setting identities (IDs) equal to the number of reference measurements, a number of RS indexes for indication of the radio resource of the selected RS equal to the number of reference measurements. Each measurement index indicates one of a plurality of previous RS measurements as a reference measurement for indication of the radio resource of the selected RS. Each RS index includes a synchronization signal block resource index (SSBRI), a channel status information reference signal resource index (CRI), or a sounding reference signal resource index (SRI). Each resource setting ID indicates an RS type including synchronization signal block (SSB), periodic channel status information reference signal (P-CSI-RS), semi-persistent channel status information reference signal (SP-CSI-RS), aperiodic channel status information reference signal (A-CSI-RS), or sounding reference signal (SRS). Each reference type includes an implicit or explicit association between an RS index and a reference measurement.

For example, as shown in FIG. 6, the MRI of a reference indicator state of "2" is associated with two reference measurements, i.e., the previous $16^{th}$ and $5^{th}$ measurements. The MRI is associated with two measurement indexes: n−16 and n−5. The measurement index=n−16 indicates the previous $16^{th}$ RS measurement as the reference measurement for transmit beam indication. The measurement index=n−5 indicates the previous $5^{th}$ RS measurement as a reference measurement for transmit beam indication. The MRI is also associated with two reference types, i.e., an explicit association with the previous $16^{th}$ measurement and an implicit association with the $5^{th}$ measurement. The explicit association with the previous $16^{th}$ measurement The MRI is also associated with two resource setting IDs: j=1 and 2. The resource setting ID: j=1 indicates P-CSI-RS and the resource setting ID: j=2 indicates SP-CSI-RS. The MRI is also associated with two RS indexes, i.e., $CRI_1$=3 and 4 and $CRI_2$=22 and 23, for indication of a transmit beam. The $CRI_1$ indicates CRI #3 and CRI #4 to be measured, and the $CRI_2$ indicate CRI #22 and #23 to be measured. As noted above, in some embodiments, an RS index for indication of a transmit beam can also be one of SSBRI, CRI, or SRI.

Figure 12:
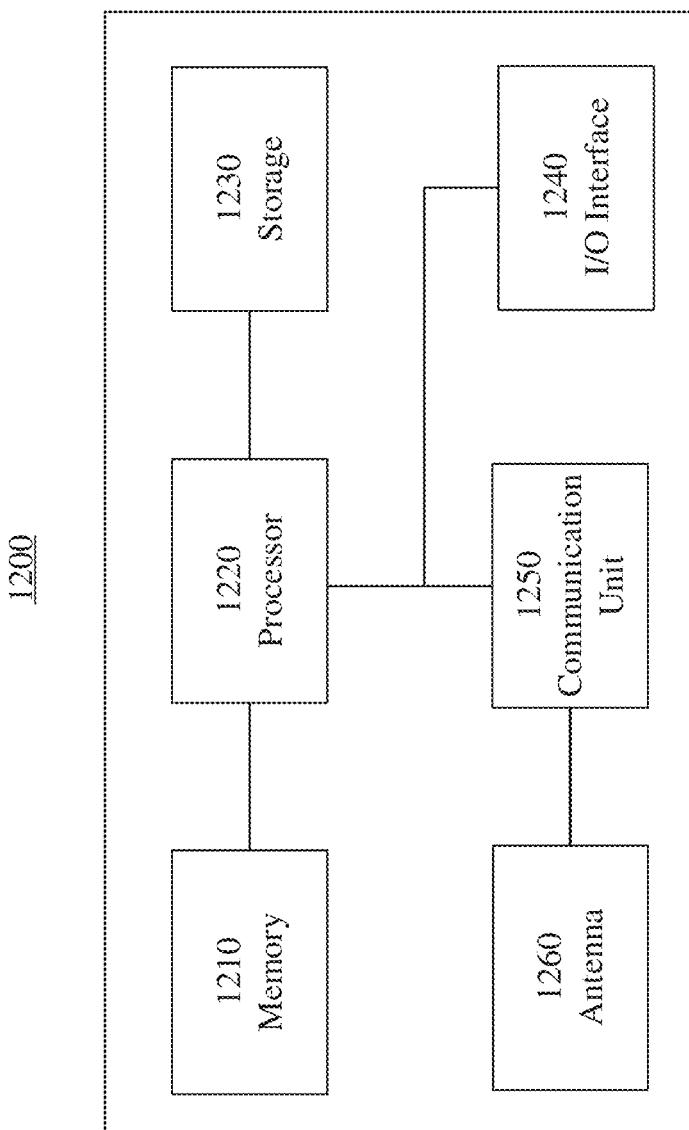
FIG. 12 is a schematic diagram of an exemplary network apparatus for indicating a radio resource to a user device in a wireless communication system, according to some embodiments of the present application.

FIG. 12 is a schematic diagram of an exemplary network apparatus 1200 for indicating a radio resource to a user device in a wireless communication system, according to some embodiments of the present application. Network apparatus 1200 includes a memory 1210, a processor 1220, a storage 1230, an I/O interface 1240, a communication unit 1250, and an antenna 1260. One or more of these elements of network apparatus 1200 may be included for indicating a radio resource to a user device in a wireless communication system. These elements may be configured to transfer data and send or receive instructions between or among each other. Base station 120 shown in FIG. 1 may be configured as network apparatus 1200. Network apparatus 1200 can be a base station, a relay station, a remote radio unit, a network node, or a home base station in a wireless communication system.

Processor 1220 includes any appropriate type of general-purpose or special-purpose microprocessor, digital signal processor, or microcontroller. Processor 1220 can be representative of one or more processors in base station 120.

Memory 1210 and storage 1230 may include any appropriate type of mass storage provided to store any type of information that processor 1220 may need to operate.

Memory 1210 and storage 1230 may be a volatile or non-volatile, magnetic, semiconductor, tape, optical, removable, non-removable, or other type of storage device or tangible (i.e., non-transitory) computer-readable medium including, but not limited to, a read-only memory (ROM), a flash memory, a dynamic random-access memory (RAM), and a static RAM. Memory 1210 and/or storage 1230 may be configured to store one or more programs for execution by processor 1220 for indicating a radio resource to a user device in a wireless communication system, as disclosed herein.

Memory 1210 and/or storage 1230 may be further configured to store information and data used by processor 1220. For instance, memory 1210 and/or storage 1230 may be configured to store a configuration of BM-RS resources associated with transmit beams $B_0$-$B_3$ and measurement results received from user device 140.

I/O interface 1240 may be configured to facilitate communication between network apparatus 1200 and other apparatuses. For example, I/O interface 1240 may receive a signal from another apparatus (e.g., a computer) including system configuration information for network apparatus 1200. I/O interface 1240 may also output data of BM-RS resources and measurement results to other apparatuses.

Communication unit 1250 may include one or more cellular communication modules, including, for example, a 5G radio access system, a Long-Term Evolution (LTE), a High Speed Packet Access (HSPA), a Wideband Code-Division Multiple Access (WCDMA), and/or a Global System for Mobile communication (GSM) communication module.

Antenna 1260 may include an isotropic antenna, a dipole antenna, or an array antenna for transmitting or receiving radio signals from or for communication unit 1250.

Processor 1220 can be configured by one or more programs stored in memory 1210 and/or storage 1230 to perform operations of base station 120 described above with respect to the methods shown in FIGS. 1-11.

Figure 13:
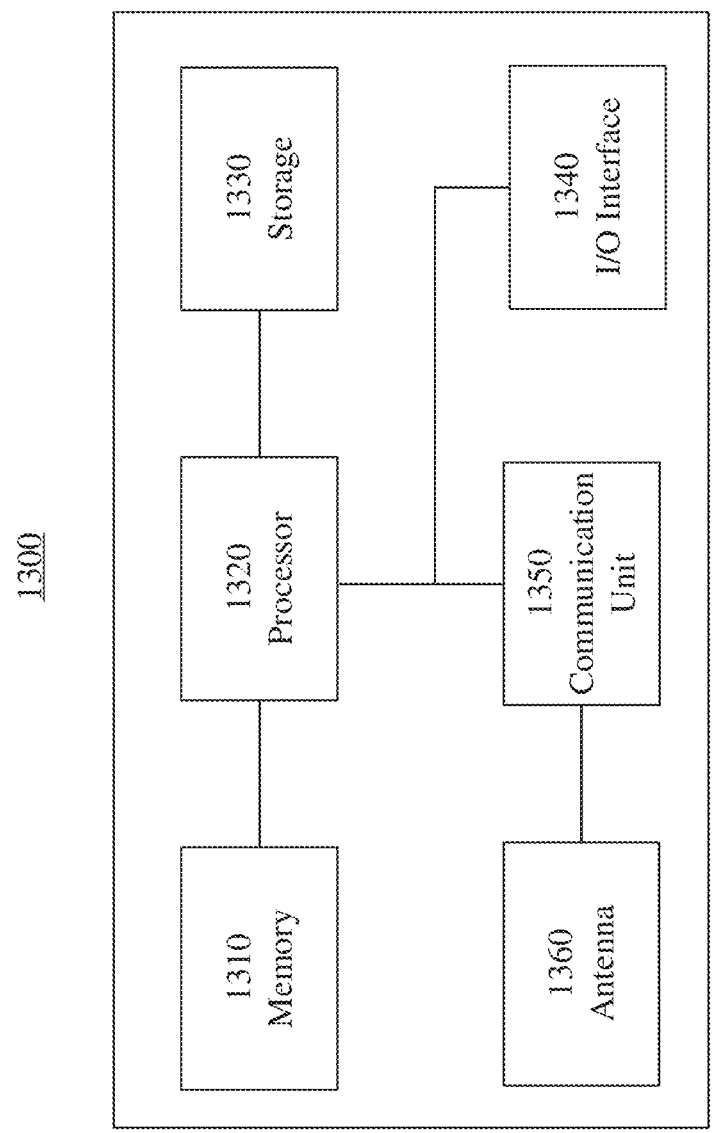
FIG. 13 is a schematic diagram of an exemplary user device for receiving indication of a radio resource in a wireless communication system, according to some embodiments of the present application.

FIG. 13 is a schematic diagram of an exemplary user device 1300 for receiving indication of a radio resource in a wireless communication system, according to some embodiments of the present application. User device 140 shown in FIG. 1 may be configured as user device 1300. User device 1300 includes a memory 1310, a processor 1320, a storage 1330, an I/O interface 1340, a communication unit 1350, and an antenna 1360. One or more of these elements of user device 1300 may be included for receiving indication of a radio resource in a wireless communication system. These elements may be configured to transfer data and send or receive instructions between or among each other.

Processor 1320 includes any appropriate type of general-purpose or special-purpose microprocessor, digital signal processor, or microcontroller. Processor 1320 can be representative of one or more processors in user device 140.

Memory 1310 and storage 1330 may be configured as described above for memory 1210 and storage 1230. Memory 1310 and/or storage 1330 may be further configured to store information and data used by processor 1320. For instance, memory 1310 and/or storage 1330 may be configured to store receive beams and MRIs for user device 140.

I/O interface 1340 may be configured to facilitate the communication between user device 1300 and other apparatuses. For example, I/O interface 1340 may receive a signal from another apparatus (e.g., a computer) including system configuration information for user device 1300. I/O interface 1340 may also output data of measurement results to other apparatuses.

Communication unit 1350 may include one or more cellular communication modules, including, for example, a 5G radio access system, a Long-Term Evolution (LTE), a High Speed Packet Access (HSPA), a Wideband Code-Division Multiple Access (WCDMA), and/or a Global System for Mobile communication (GSM) communication module.

Antenna 1360 may include an isotropic antenna, a dipole antenna, or an array antenna for transmitting or receiving radio signals from or for communication unit 1350.

Processor 1320 can be configured by one or more programs stored in memory 1310 and/or storage 1330 to perform operations of user device 140 described above with respect to the methods shown in FIGS. 1-11.

Another aspect of the disclosure is directed to a non-transitory computer-readable medium storing instructions which, when executed, cause one or more processors to perform the methods shown in FIGS. 1-11. The computer-readable medium may include volatile or non-volatile, magnetic, semiconductor, tape, optical, removable, non-removable, or other types of computer-readable medium or computer-readable storage devices. For example, the computer-readable medium may be the storage device or the memory module having the computer instructions stored thereon, as disclosed. In some embodiments, the computer-readable medium may be a disc or a flash drive having the computer instructions stored thereon.

It will be appreciated that the present disclosure is not limited to the exact construction that has been described above and illustrated in the accompanying drawings, and that various modifications and changes can be made without departing from the scope thereof. It is intended that the scope of the application should only be limited by the appended claims.

What is claimed is:

1. A method for indicating a radio resource to a receiver in a wireless communication system, the method comprising:
    allocating a plurality of reference signals (RSs) for beam indication;
    selecting one of the plurality of RSs for the receiver; and
    transmitting information about the selected RS to the receiver,
    wherein the information includes a reference indication (RI) that indicates the radio resource of the selected RS.

2. The method of claim 1, wherein the selected RS is a first RS and the RI indicates a radio resource of a second RS, wherein the second RS is quasi-co-located with the first RS, wherein a parameter of the first RS being referred to for indicating the second RS.

3. The method of claim 1, wherein the RI indicates one of a plurality of RS measurements as a reference measurement for indication of the radio resource of the selected RS.

4. The method of claim 1, wherein the RI is transmitted to the receiver in:
    a radio resource control (RRC) message,
    a medium access control (MAC) control element (CE),
    a downlink control information (DCI) message, or
    any combination thereof.

5. The method of claim 4, wherein:
    the RI transmitted in the RRC message indicates a periodic RS measurement as a reference measurement for indicating the radio resource of the selected RS, the RI transmitted in the MAC CE indicates a semi-persistent RS measurement as the reference measurement for indicating the radio resource of the selected RS, and the RI transmitted in the DCI message indicates aperiodic RS measurement as the reference measurement for indicating the radio resource of the selected RS.

6. The method of claim 1, wherein the RI is associated with an RS index for indicating the radio resource of the selected RS, wherein:
the RS index includes:
a synchronization signal block resource index,
a channel status information reference signal resource index, or
a sounding reference signal resource index.

7. The method of claim 1, wherein the RI is associated with a resource setting identity (ID),
wherein the resource setting ID indicates an RS type including:
synchronization signal block,
periodic channel status information reference signal,
semi-persistent channel status information reference signal,
aperiodic channel status information reference signal, or
sounding reference signal.

8. The method of claim 1, wherein the RI is associated with a measurement index,
wherein the measurement index indicates one of a plurality of previous RS measurements as a reference measurement for indicating the radio resource of the selected RS.

9. The method of claim 1, wherein the RI is associated with an RS index for indicating a reference radio resource of the selected RS and with a reference type, wherein the reference type includes:
an implicit association between the RS index and a reference measurement, or
an explicit association between the RS index and the reference measurement.

10. The method of claim 9, wherein when the reference type includes the implicit association, the RS index includes:
a full set of RS indexes of the reference measurement,
wherein the reference measurement includes measurements in accordance with the RS indexes of the reference measurement.

11. The method of claim 9, wherein when the reference type includes the explicit association,
the RS index includes a subset of RS indexes of the reference measurement, and
the method further comprises transmitting one or more RS indexes in a radio resource control message or a medium access control (MAC) control element to the receiver,
wherein the transmitted one or more RS indexes are in the subset of RS indexes of the reference measurement,
wherein the reference measurement includes measurements in accordance with the RS indexes of the reference measurement.

12. The method of claim 1, wherein the RI is associated with a number of reference measurements, wherein the RI is further associated with at least one of:
a number of measurement indexes equal to the number of reference measurements,
a number of reference types equal to the number of reference measurements,
a number of resource setting identities (IDs) equal to the number of reference measurements, or
a number of RS indexes for indication of radio resources of RSs equal to the number of reference measurements, wherein:
each measurement index indicates one of a plurality of previous RS measurements as a reference measurement for indication of the radio resource of the selected RS,
each RS index includes a synchronization signal block (SSB) resource index, a channel status information reference signal resource index, or a sounding reference signal resource index,
each resource setting ID indicates an RS type including SSB, periodic channel status information reference signal, semi-persistent channel status information reference signal, aperiodic channel status information reference signal, or sounding reference signal, and
each reference type includes an implicit or explicit association between an RS index and a reference measurement.

13. The method of claim 1, wherein selecting one of the plurality of RSs for the receiver includes:
selecting in accordance with a plurality of RS measurement results received from the receiver.

14. The method of claim 1, wherein allocating the plurality of RSs for beam indication includes:
allocating a plurality of RS measurement resources corresponding to a plurality of transmit beams,
wherein the plurality of RS measurement resources include radio resources of a synchronization signal block, a channel status information reference signal, or a sounding reference signal.

15. A method for receiving indication of a radio resource for a receiver in a wireless communication system, the method comprising:
allocating a plurality of radio resources to receive reference signals (RSs) for beam indication from a transmitter;
receiving information about the radio resource of a selected one of the RSs from the transmitter, wherein the information includes a reference indication (RI) that indicates the radio resource of the selected RS; and
determining one of the plurality of RSs for receiving a signal from the transmitter in accordance with the indication of the radio resource of the selected RS.

16. The method of claim 15, wherein the selected RS is a first RS and the RI indicates a radio resource of a second RS, wherein the second RS is quasi-co-located with the first RS, a parameter of the first RS being referred to for indication of the second RS.

17. The method of claim 15, wherein the RI indicates one of a plurality of RS measurements as a reference measurement for indicating the radio resource of the selected RS.

18. The method of claim 15, wherein the RI is received from the transmitter in:
a radio resource control (RRC) message,
a medium access control (MAC) control element (CE),
a downlink control information (DCI) message, or
any combination thereof.

19. The method of claim 18, wherein:
the RI received in the RRC message indicates a periodic RS measurement as a reference measurement for indicating the radio resource of the selected RS,
the RI received in the MAC CE indicates a semi-persistent RS measurement as the reference measurement for indicating the radio resource of the selected RS, and the RI received in the DCI message indicates aperiodic RS measurement as the reference measurement for indicating the radio resource of the selected RS.

20. The method of claim 15, wherein the RI is associated with an RS index for indicating the radio resource of the selected RS, wherein:
the RS index includes:
a synchronization signal block resource index,
a channel status information reference signal resource index, or
a sounding reference signal resource index.

21. The method of claim 15, wherein the RI is associated with a resource setting identity (ID),
wherein the resource setting ID indicates an RS type including:
synchronization signal block,
periodic channel status information reference signal,
semi-persistent channel status information reference signal,
aperiodic channel status information reference signal, or
sounding reference signal.

22. The method of claim 15, wherein the RI is associated with a measurement index,
wherein the measurement index indicates one of a plurality of previous RS measurements as a reference measurement for indicating the radio resource of the selected RS.

23. The method of claim 15, wherein the RI is associated with an RS index for indication of a reference radio resource and with a reference type, wherein the reference type includes:
an implicit association between the RS index and a reference measurement, or
an explicit association between the RS index and the reference measurement.

24. The method of claim 23, wherein when the reference type includes the implicit association, the RS index includes:
a full set of RS indexes of the reference measurement,
wherein the reference measurement includes measurements in accordance with the RS indexes of the reference measurement.

25. The method of claim 23, wherein when the reference type includes the explicit association,
the RS index includes a subset of RS indexes of the reference measurement, and
the method further comprises receiving one or more RS indexes in a radio resource control message or a medium access control (MAC) control element from the transmitter,
wherein the one or more RS indexes are in the subset of RS indexes of the reference measurement,
wherein the reference measurement includes measurements in accordance with the RS indexes of the reference measurement.

26. The method of claim 15, wherein the RI is associated with a number of reference measurements, wherein the RI is further associated with at least one of:
a number of measurement indexes equal to the number of reference measurements,
a number of reference types equal to the number of reference measurements,
a number of resource setting identities (IDs) equal to the number of reference measurements, or
a number of RS indexes for indicating the radio resource of the selected RS equal to the number of reference measurements, wherein:

each measurement index indicates one of a plurality of previous RS measurements as a reference measurement for indicating the radio resource of the selected RS,
each RS index includes a synchronization signal block (SSB) resource index, a channel status information reference signal resource index, or a sounding reference signal resource index,
each resource setting ID indicates an RS type including SSB, periodic channel status information reference signal, semi-persistent channel status information reference signal, aperiodic channel status information reference signal, or sounding reference signal, and
each reference type includes an implicit or explicit association between an RS index and a reference measurement.

27. The method of claim 15, wherein determining one of the plurality of RSs for receiving a signal from the transmitter in accordance with the indication of the radio resource of the selected RS includes:
determining in accordance with the RI and a plurality of RS measurement results.

28. The method of claim 15, wherein allocating the plurality of radio resources to receive RSs for beam indication from the transmitter includes:
allocating a plurality of RS measurement resources corresponding to a plurality of receive beams,
wherein the plurality of RS measurement resources include radio resources of a synchronization signal block, a channel status information reference signal, or a sounding reference signal.

29. Network apparatus for indicating a radio resource for a user device to receive a signal in a wireless communication system, the network apparatus comprising:
a memory storing instructions; and
a processor configured to execute the instructions to cause the network apparatus to:
allocate a plurality of RSs for beam indication;
select one of the plurality of RSs for the user device; and
transmit information about the selected RS to the user device,
wherein the information includes a reference indication (RI) that indicates the radio resource of the selected RS.

30. The network apparatus of claim 29, wherein the selected RS is a first RS and the RI indicates a radio resource of a second RS, wherein the second RS is quasi-co-located with the first RS, a parameter of the first RS being referred to for indication of the second RS.

31. The network apparatus of claim 29, wherein the RI is associated with a number of reference measurements, wherein the RI is further associated with at least one of:
a number of measurement indexes equal to the number of reference measurements,
a number of reference types equal to the number of reference measurements,
a number of resource setting identities (IDs) equal to the number of reference measurements, or
a number of RS indexes for indicating radio resources of RSs equal to the number of reference measurements, wherein:
each measurement index indicates one of a plurality of previous RS measurements as a reference measurement for indicating the radio resource of the selected RS,
each RS index includes a synchronization signal block (SSB) resource index, a channel status information reference signal resource index, or a sounding reference signal resource index, each resource setting ID indicates an RS type including SSB, periodic channel status information reference signal, semi-persistent channel status information reference signal, aperiodic channel status information reference signal, or sounding reference signal, and each reference type includes an implicit or explicit association between an RS index and a reference measurement.

32. A user device for receiving indication of a radio resource in a wireless communication system, the user device comprising:
   a memory storing instructions; and
   a processor configured to execute the instructions to cause the user device to:
   allocate a plurality of radio resources to receive reference signals (RSs) for beam indication from network apparatus;
   receive information about the radio resource of a selected one of the RSs from the network apparatus, wherein the information includes a reference indication (RI) that indicates the radio resource of the selected RS; and
   determine one of the plurality of RSs for receiving a signal from the network apparatus in accordance with the indication of the radio resource of the selected RS.

33. The user device of claim 32, wherein the selected RS is a first RS and the RI indicates a radio resource of a second RS, wherein the second RS is quasi-co-located with the first RS, a parameter of the first RS being referred to for indication of the second RS.

34. The user device of claim 32, wherein the RI is associated with a number of reference measurements, wherein the RI is further associated with at least one of:
   a number of measurement indexes equal to the number of reference measurements,
   a number of reference types equal to the number of reference measurements,
   a number of resource setting identities (IDs) equal to the number of reference measurements, or
   a number of RS indexes for indicating the radio resource of the selected RS equal to the number of reference measurements, wherein:
   each measurement index indicates one of a plurality of previous RS measurements as a reference measurement for indicating the radio resource of the selected RS,
   each RS index includes a synchronization signal block (SSB) resource index, a channel status information reference signal resource index, or a sounding reference signal resource index,
   each resource setting ID indicates an RS type including SSB, periodic channel status information reference signal, semi-persistent channel status information reference signal, aperiodic channel status information reference signal, or sounding reference signal, and
   each reference type includes an implicit or explicit association between an RS index and a reference measurement.

35. A non-transitory computer-readable medium storing instructions that are executable by one or more processors of apparatus to perform a method for indicating a radio resource to a receiver in a wireless communication system, the method comprising:
   allocating a plurality of reference signals (RSs) for beam indication;
   selecting one of the plurality of RSs for the receiver; and
   transmitting information about the selected RS to the receiver,
   wherein the information includes a reference indication (RI) that indicates the radio resource of the selected RS.

36. A non-transitory computer-readable medium storing instructions that are executable by one or more processors of apparatus to perform a method for receiving indication of a radio resource in a wireless communication system, the method comprising:
   allocating a plurality of radio resources to receive reference signals (RSs) for beam indication from a transmitter;
   receiving information about the radio resource of a selected one of the RSs from the transmitter, wherein the information includes a reference indication (RI) that indicates the radio resource of the selected RS; and
   determining one of the plurality of RSs for receiving a signal from the transmitter in accordance with the indication of the radio resource of the selected RS.

* * * * *